US007519175B2

(12) United States Patent
Suzuki et al.

(10) Patent No.: US 7,519,175 B2
(45) Date of Patent: Apr. 14, 2009

(54) INTEGRAL MICROPHONE AND SPEAKER CONFIGURATION TYPE TWO-WAY COMMUNICATION APPARATUS

(75) Inventors: Ryuji Suzuki, Tokyo (JP); Michie Sato, Tokyo (JP); Ryuichi Tanaka, Kanagawa (JP); Tsutomu Shoji, Kanagawa (JP); Noboru Shuhama, Tokyo (JP)

(73) Assignee: Sony Corporation, Tokyo (JP)

( * ) Notice: Subject to any disclaimer, the term of this patent is extended or adjusted under 35 U.S.C. 154(b) by 352 days.

(21) Appl. No.: 10/556,415

(22) PCT Filed: May 13, 2004

(86) PCT No.: PCT/JP2004/006765

§ 371 (c)(1),
(2), (4) Date: Jun. 27, 2006

(87) PCT Pub. No.: WO2004/103016

PCT Pub. Date: Nov. 25, 2004

(65) Prior Publication Data

US 2007/0064925 A1 Mar. 22, 2007

(30) Foreign Application Priority Data

May 13, 2003 (JP) ............................ 2003-135204

(51) Int. Cl.
*H04M 1/00* (2006.01)
*H04M 9/00* (2006.01)

(52) U.S. Cl. ................................ 379/420.01; 381/111

(58) Field of Classification Search ................................ 379/420.01–420.03, 202.01; 381/92, 111, 381/306, 160, 345
See application file for complete search history.

(56) References Cited

U.S. PATENT DOCUMENTS

| | | | |
|---|---|---|---|
| 3,649,776 A | 3/1972 | Burton |
| 5,561,737 A | 10/1996 | Bowen |
| 2003/0059061 A1 | 3/2003 | Tsuji et al. |

FOREIGN PATENT DOCUMENTS

| | | |
|---|---|---|
| JP | 50 141631 | 11/1975 |
| JP | 63 44590 | 3/1988 |
| JP | 8-70494 | 3/1996 |

(Continued)

*Primary Examiner*—Curtis Kuntz
*Assistant Examiner*—Tuan D Nguyen
(74) *Attorney, Agent, or Firm*—Frommer Lawrence & Haug LLP; William S. Frommer; Thomas F. Presson

(57) ABSTRACT

A two-way communication apparatus used for two-way speech. In the two-way communication apparatus, a plurality of microphones radially arranged in a horizontal direction are located at equal distances from a receiving and reproduction speaker. The plurality of microphones are located in pairs from the center of the receiving and reproduction speaker. Surface of a sound reflection plate facing the side surfaces of a speaker housing are curved to a flared shape and diffuse the sound output from an upper sound output opening in all orientations in the horizontal direction by cooperating with the sound reflection surface. A DSP receives as input sound pickup signals of one pair of the microphones, selects the microphone for which the highest sound is detected, and transmits the sound pickup signal to the two-way communication apparatus of the other party via a telephone line.

7 Claims, 22 Drawing Sheets

FOREIGN PATENT DOCUMENTS

| | | |
|---|---|---|
| JP | 08-288999 | 11/1996 |
| JP | 9 168194 | 6/1997 |
| JP | 10 136058 | 5/1998 |
| JP | 2000 253134 | 9/2000 |
| JP | 2002-078052 | 3/2002 |
| JP | 2003-87887 | 3/2003 |

WHEN SOUND SOURCE IS IN FRONT OF MICROPHONE

WHEN SOUND SOURCE IS IN DIRECTION 60 DEGREES FROM FRONT OF MICROPHONE

WHEN SOUND SOURCE IS IN DIRECTION 120 DEGREES FROM FRONT OF MICROPHONE

WHEN SOUND SOURCE IS IN DIRECTION 180 DEGREES FROM FRONT OF MICROPHONE (9-4)

FILTER PROCESSING FLOW (SHOW 1/6)

FILTER FREQUENCY CHARACTERISTIC IMAGE DIAGRAM

DSP FILTER PROCESSING FLOW

SELECTION SWITCH PROCESSING OF MICROPHONE SIGNAL

INTEGRAL MICROPHONE AND SPEAKER CONFIGURATION TYPE TWO-WAY COMMUNICATION APPARATUS

TECHNICAL FIELD

The present invention relates to an integral microphone and speaker configuration type two-way communication apparatus suitable for, for example, when a plurality of conference participants in two conference rooms hold a conference by voice.

BACKGROUND ART

A TV conference system has been used to enable conference participants in two conference rooms at distant locations to hold a conference. A TV conference system captures images of the conference participants in the conference rooms by imaging means, picks up (collects) their voices by microphones, sends the captured images and the picked up voices through a communication channel, displays the captured images on display units of TV receivers of the conference rooms of the other parties, and outputs the picked up voices from speakers.

In such a TV conference system, it suffers from the disadvantage that in each conference room, it is difficult to pick up the voices of the speaking parties at positions distant from the imaging means and the microphones. As a means for dealing with this, sometimes a microphone is provided for each conference participant.

Further, it also suffers from the disadvantage that the voices output from the speakers of the TV receivers are hard for conference participants at positions distant from the speakers to hear.

Japanese Unexamined Patent Publication (Kokai) No. 2003-87887 and Japanese Unexamined Patent Publication (Kokai) No. 2003-87890 disclose, in addition to a usual TV conference system providing video and audio signals when holding TV conferences in conference rooms at distant locations, a voice input/output system integrally configured by microphones and speakers having the advantages that the voices of conference participants in the conference rooms of the other parties can be clearly heard from the speakers and there is little effect from noise in the individual conference rooms or the load of echo cancellers is light.

For example, the voice input/output system disclosed in Japanese Unexamined Patent Publication (Kokai) No. 2003-87887, as described with reference to FIG. 5 to FIG. 8, FIG. 9, and FIG. 23 of that publication, is structured, from the bottom to the top, by a speaker box 5 having a built-in speaker 6, a conical reflection plate 4 radially opening upward for diffusing sound, a sound blocking plate 3, and a plurality of single directivity microphones (four in FIG. 6 and FIG. 7 and six in FIG. 23) supported by poles 8 in a horizontal plane radially at equal angles. The sound blocking plate 3 is for blocking sound from the lower speaker 5 from entering the plurality of microphones.

The voice input/output system disclosed in Japanese Unexamined Patent Publication (Kokai) Nos. 2003-87887 and 2003-87890 is utilized as means for supplementing a TV conference system for providing video and audio.

As a remote conference system, however, often a complex apparatus such as a TV conference system does not have to be used: voice alone is sufficient. For example, when a plurality of conference participants hold a conference between a head office and a distant sales office of the same company, since everyone knows what everyone looks like and understands who is speaking by their voices, the conference can be sufficiently held without the video by a TV conference system.

Further, when introducing a TV conference system, it suffers from the disadvantages such as the large investment for introducing the TV conference system per se, the complexity of the operation, and the large communication costs for transmitting the captured images.

If assuming the case of application to such a conference using only audio, the voice input/output system disclosed in Japanese Unexamined Patent Publication (Kokai) No. 2003-87887 and Japanese Unexamined Patent Publication (Kokai) No. 2003-87890 can be improved in many ways from the viewpoint of the performance, the viewpoint of the price, the viewpoint of the dimensions, and the viewpoints of suitability with the usage environment, user-friendliness, etc.

DISCLOSURE OF THE INVENTION

An object of the present invention is to provide a communication apparatus further improved from the viewpoint of performance as means used for only two-way speech, the viewpoint of price, the viewpoint of dimensions, and the viewpoints of suitability with the usage environment, user-friendliness, etc.

According to a first aspect of the present invention, there is provided an integral microphone and speaker configuration type two-way communication apparatus including a speaker directed to a vertical direction, a speaker housing having the speaker built in and an upper sound output opening for emitting the sound of the speaker at a center perpendicular portion and having side surfaces inclined or curved outward, a sound reflection plate centered in a vertical direction facing the speaker, having surfaces facing the side surfaces of the speaker housing curved to a conical flared shape, and diffusing sound output from the upper sound output opening in all orientations in the horizontal direction by cooperating with the side surfaces of the speaker housing, at least one pair of microphones having directivity located in an opening end of the sound reflection plate and arranged around the center axis of the speaker radially in the horizontal direction and on straight lines straddling the center axis, a first signal processing means for processing picked up sound signals of the microphones, and a second signal processing means for processing the processing results of the first signal processing means so as to cancel echo of the audio signal components output from the speaker, wherein the at least one pair of microphones are located at equal distances from said speaker.

Preferably, the first signal processing means receives as input the picked up sound signals of the one pair of microphones, selects the microphone from which the highest sound is detected, and sends the picked up signals thereof.

More preferably, the first signal processing means eliminates from the picked up sound signals of the microphones the noise components found by measuring noise of the environment in which the two-way communication apparatus is previously disposed when selecting the microphone.

Preferably, the first signal processing means refers to the signal difference of the pair of microphones to detect the direction of the highest audio and determine the microphone to be selected.

More preferably the first signal processing means separates bands of the picked up sound signals of the microphones when selecting the microphone and converts the in level to determine the microphone to be selected.

Preferably, the two-way communication apparatus has an outputting means for enabling visual discrimination of the selected microphone, and the first signal processing means outputs the picked up sound signals to the corresponding outputting means when selecting the microphone.

Specifically, the outputting means is a light emission diode.

BEST MODE FOR CARRYING OUT THE INVENTION

These and other objects and effects of the present invention will become clearer from the following description given with reference to the accompanying drawings.

First, an example of the application of the integral microphone and speaker configuration type two-way communication apparatus (hereinafter referred to as the "two-way communication apparatus") of the present invention will be explained.

Figure 1A:
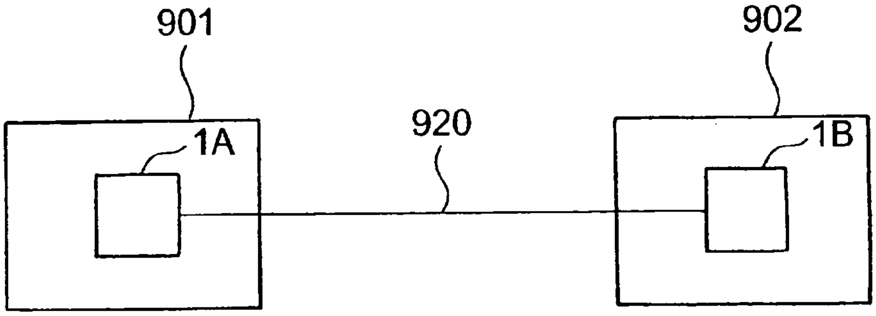
FIG. 1A is a view schematically showing a conference system as an example to which an integral microphone and speaker configuration type two-way communication apparatus (two-way communication apparatus) of the present invention is applied.
Figure 1B:
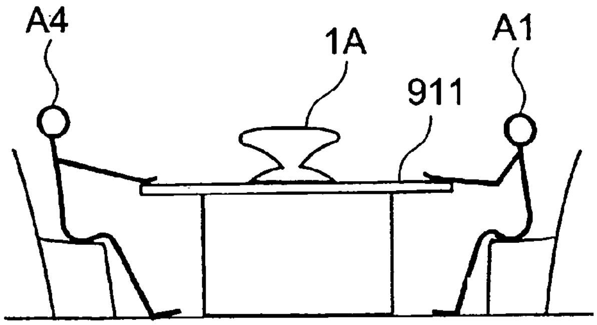
FIG. 1B is a view of a state where the two-way communication apparatus in FIG. 1A is placed.
Figure 1C:
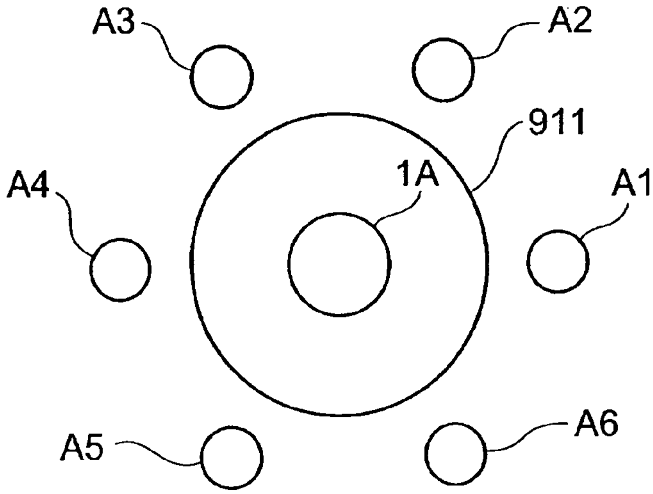
FIG. 1C is a view of the arrangement of the two-way communication apparatus placed on a table and conference participants.

FIGS. 1A to 1C are views of the configuration showing an example to which the integral microphone and speaker configuration type two-way communication apparatus (hereinafter referred to as the "two-way communication apparatus") of the present invention is applied.

As illustrated in FIG. 1A, two-way communication apparatuses 1A and 1B are disposed in two conference rooms 901 and 902 at distant locations. These two-way communication apparatuses 1A and 1B are connected by a telephone line 920.

As illustrated in FIG. 1B, in the two conference rooms 901 and 902, the two-way communication apparatuses 1A and 1B are placed on tables 911 and 912. Note, in FIG. 1B, for simplification of the illustration, only the two-way communication apparatus 1A in the conference room 901 is illustrated. The two-way communication apparatus 1B in the conference room 902 is the same however. A perspective view of the outer appearance of the two-way communication apparatuses 1A and 1B is given in FIG. 2.

As illustrated in FIG. 1C, a plurality of conference participants A1 to A6 are positioned around each of the two-way communication apparatuses 1A and 1B. Note that in FIG. 1C, for simplification of the illustration, only the conference participants around the two-way communication apparatus 1A in the conference room 901 are illustrated. The arrangement of the conference participants located around the two-way communication apparatus 1B in the other conference room 902 is the same however.

The two-way communication apparatus of the present invention enables questions and answers by voice between for example the two conference rooms 901 and 902 via the telephone line 920.

Usually, a conversation via the telephone line 920 is carried out between one speaker and another, that is, one-to-one, but in the two-way communication apparatus of the present invention, a plurality of conference participants A1 to A6 can converse with each other by using one telephone line 920. Note that although details will be explained later, in order to avoid congestion of audio, the parties speaking at the same time are limited to one selected from one conference room.

The two-way communication apparatus of the present invention covers audio (speech), so only transmits audio via the telephone line 920. In other words, a large amount of image data is not transmitted as in a TV conference system. Further, the two-way communication apparatus of the present invention compresses the speech of the conference participants for transmission, so the transmission load of the telephone line 920 is light.

Configuration of Communication Apparatus

The configuration of the two-way communication apparatus according to an embodiment of the present invention will be explained first referring to FIG. 2 to FIG. 4.

Figure 2:
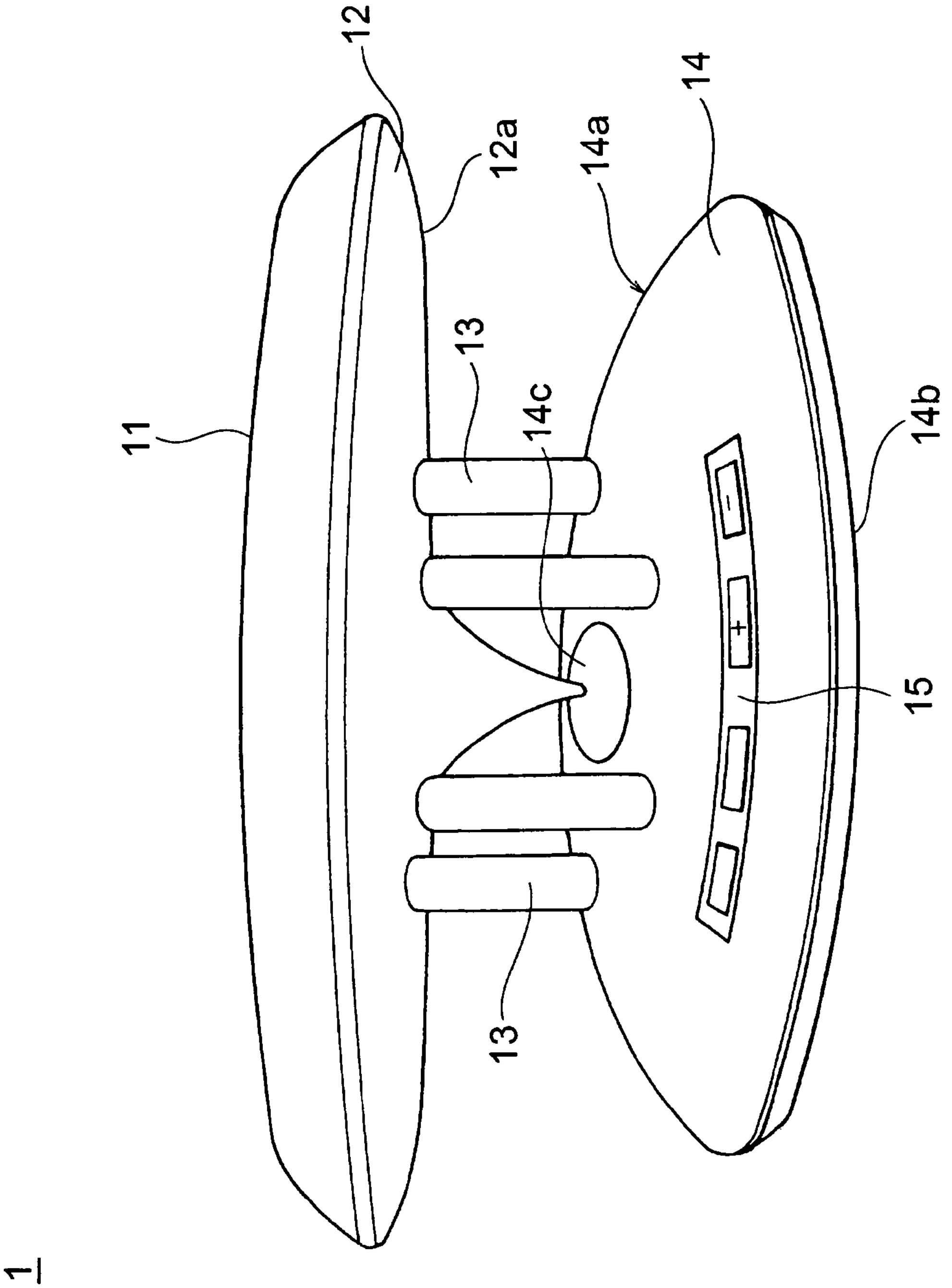
FIG. 2 is a perspective view of the integral microphone and speaker configuration type two-way communication apparatus of an embodiment of the present invention.

FIG. 2 is a perspective view of the two-way communication apparatus according to an embodiment of the present invention.

Figure 3:
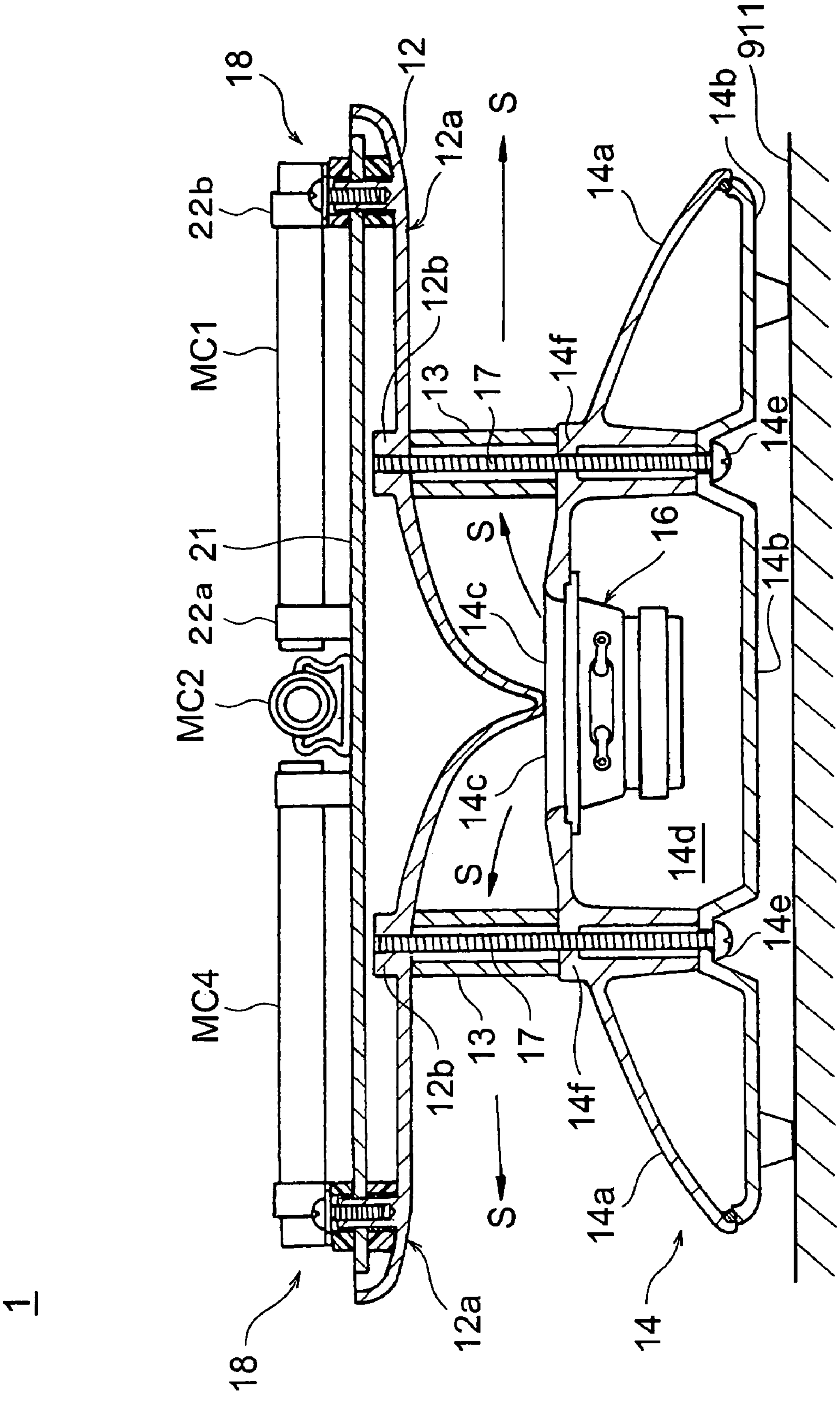
FIG. 3 is a cross-sectional view of the inside of the two-way communication apparatus illustrated in FIG. 1.

FIG. 3 is a sectional view of the two-way communication apparatus illustrated in FIG. 2.

Figure 4:
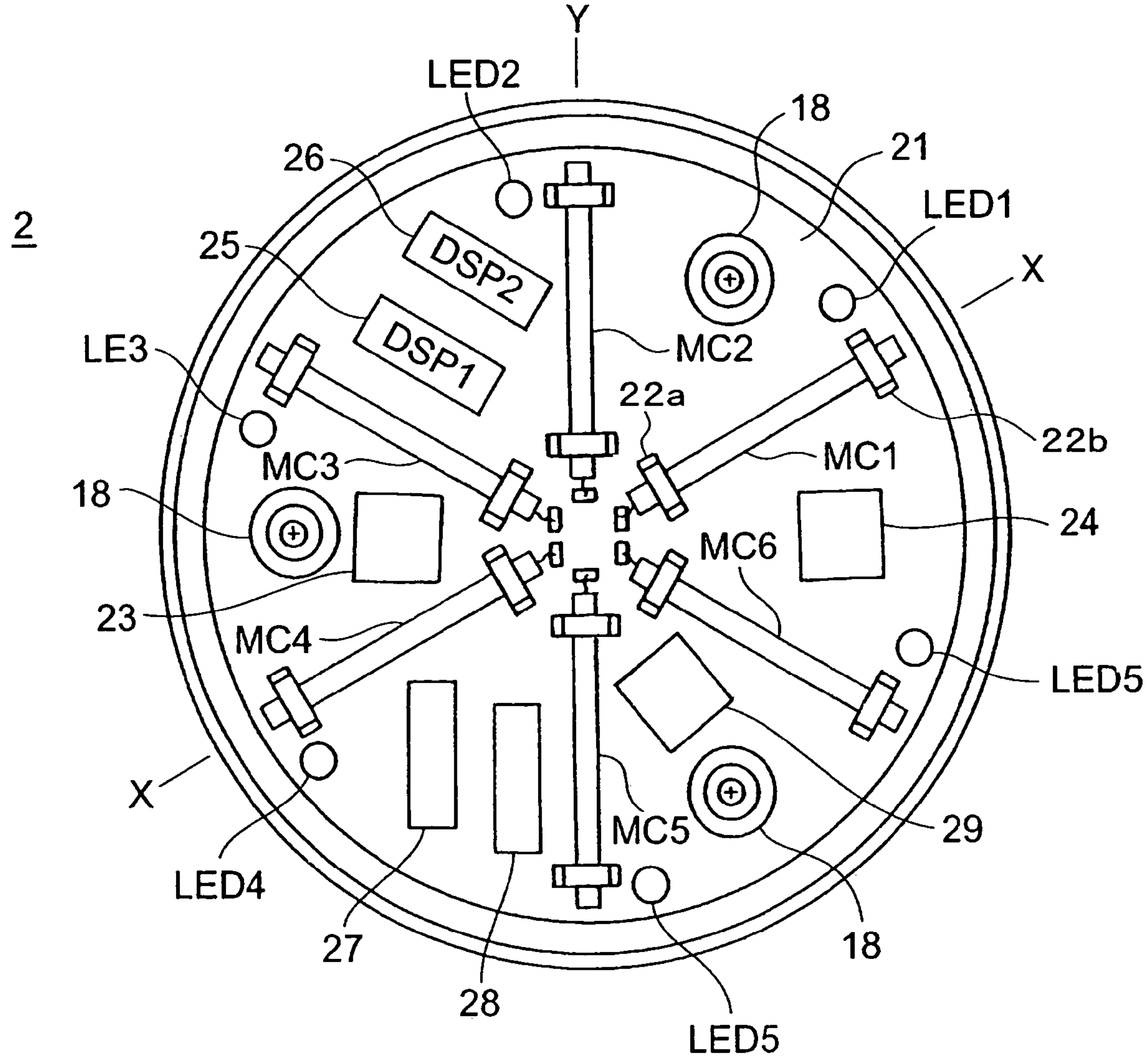
FIG. 4 is a plan view of a microphone electronic circuit housing with the upper cover detached in the two-way communication apparatus illustrated in FIG. 1.

FIG. 4 is a plan view of a microphone electronic circuit housing of the two-way communication apparatus illustrated in FIG. 1 and a plan view along a line X-X-Y of FIG. 3.

As illustrated in FIG. 2, the two-way communication apparatus 1 has an upper cover 11, a sound reflection plate 12, coupling members 13, a speaker housing 14, and an operation unit 15.

As illustrated in FIG. 3, the speaker housing 14 has a sound reflection surface 14*a*, a bottom surface 14*b*, and an upper sound output opening 14*c*. A receiving and reproduction speaker 16 is housed in a space surrounded by the sound reflection surface 14*a* and the bottom surface 14*b*, that is, an inner cavity 14*d*. The sound reflection plate 12 is located above the speaker housing 14. The speaker housing 14 and the sound reflection plate 12 are connected by coupling members 13.

Each coupling member 13 has a fastening member 17 passed through it. The fastening member 17 fastens a fastening member bottom attachment part 14*e* of the bottom surface 14*b* of the speaker housing 14 and a fastening member attachment part 12*b* of the sound reflection plate 12. Note that the fastening member 17 is only passed through a fastening member passage 14*f* of the speaker housing 14. The reason why the fastening member 17 is passed through the fastening member passage 14*f* and does not fasten it is that the speaker housing 14 vibrates by the operation of the speaker 16 and the vibration thereof is not restricted around the upper sound output opening 14*c*.

Speakers

Speech by a speaking party of the other conference room passes through the receiving and reproduction speaker 16 and upper sound output opening 14*c* and is diffused along the space defined by the sound reflection surface 12*a* of the sound reflection plate 12 and the sound reflection surface 14*a* of the speaker housing 14.

The cross-section of the sound reflection surface 12*a* of the sound reflection plate 12 draws a gentle flaring arc as illustrated. The cross-section of the sound reflection surface 12*a* forms the illustrated sectional shape over 360 degrees (entire orientation).

Similarly, the cross-section of the sound reflection surface 14*a* of the speaker housing 14 draws a gentle bulging shape as illustrated. The cross-section of the sound reflection surface 14*a* forms the illustrated sectional shape over 360 degrees (entire orientation).

The sound S output from the receiving and reproduction speaker 16 passes through the upper sound output opening 14*c*, passes through the sound output space defined by the sound reflection surface 12*a* and the sound reflection surface 14*a*, is diffused along the surface of the table 911 on which the audio responding apparatus 1 is placed in all directions, and is heard with an equal volume by all conference participants A1 to A6. In the present embodiment, the surface of the table 911 is utilized as part of the sound propagating means.

The state of diffusion of the sound S is shown by the arrows.

The sound reflection plate 12 supports a printed circuit board 21.

The printed circuit board 21, as illustrated planarly in FIG. 4, mounts the microphones MC1 to MC6 of the microphone electronic circuit housing 2, light emitting diodes LED1 to LED6, a microprocessor 23, a codec 24, a first digital signal processor (DSP1) DSP 25, a second digital signal processor (DSP2) DSP 26, an A/D converter block 27, a D/A converter block 28, an amplifier block 29, and other various types of electronic circuits. The sound reflection plate 12 illustrated in FIG. 3 also functions as a member for supporting the microphone electronic circuit housing 2.

The printed circuit board 21 has dampers 18 attached to it for preventing vibration from the receiving and reproduction speaker 16 from being transmitted through the sound reflection plate 12 and entering the microphones MC1 to MC6 etc. Due to this, the microphones MC1 to MC6 are not affected much by sound from the speaker 16.

Arrangement of Microphones As illustrated in FIG. 4, six microphones MC1 to MC6 are located radially at equal angles (at intervals of 60 degrees in the present embodiment) from the center of the printed circuit board 21. Each microphone is a microphone having single directivity. The characteristics thereof will be explained later.

As illustrated in FIG. 3 to FIG. 4, each of the microphones MC1 to MC6 is supported by a first microphone support member 22*a* and a second microphone support member 22*b* both having flexibility or resiliency so that it can freely rock (illustration is made for only the first microphone support member 22*a* and second microphone support member 22*b* of the microphone MC1 for simplifying the illustration). In addition to the measure of preventing the influence of vibration from the receiving and reproduction speaker 16 by the dampers 18 mentioned above, the influence of vibration from the receiving and reproduction speaker 16 upon the first microphone support member 22*a* and the second microphone support member 22*b* is prevented.

As illustrated in FIG. 3, the receiving and reproduction speaker 16 is oriented vertically with respect to the center axis of the plane in which the microphones MC1 to MC6 are located (directed upward in the present embodiment). By such an arrangement of the receiving and reproduction speaker 16 and the six microphones MC1 to MC6, the distances between the receiving and reproduction speaker 16 and the microphones MC1 to MC6 become equal and the audio from the receiving and reproduction speaker 16 arrives at the microphones MC1 to MC6 with substantially the same volume and same phase. However, due to the configuration of the sound reflection surface 12*a* of the sound reflection plate 12 and the sound reflection surface 14*a* of the speaker housing 14, the sound of the receiving and reproduction speaker 16 is prevented from being directly input to the microphones MC1 to MC6.

The conference participants A1 to A6, as illustrated in FIG. 1C, are usually positioned at substantially equal angles or substantially equal intervals in the 360 degree direction around the audio response apparatus 1.

Light Emission Diodes

Light emission diodes LED1 to LED6 for notification of determination of the speaking party are arranged in the vicinity of the microphones MC1 to MC6.

Note that the light emission diodes LED1 to LED6 are provided so as to be able be viewed from all conference participants A1 to A6 even in a state where the upper cover 11 is attached. Accordingly, the upper cover 11 is provided with transparent window so that the light emission states of the light emission diodes LED1 to LED6 can be viewed. Naturally openings can also be provided at the portions of the light emission diodes LED1 to LED6 in the upper cover 11, but a transparent window is preferred from the viewpoint for preventing dust from entering the microphone electronic circuit housing 2.

In order to perform the various types of signal processing explained later, the printed circuit board 21 is provided with a DSP 25, a DSP 26, and various types of electronic circuits 27 to 29 arranged at a space other than the portion where the microphones MC1 to MC6 are located.

In the present embodiment, the DSP 25 is used as the signal processing means for performing processing such as filter processing and microphone selection processing together with the various types of electronic circuits 27 to 29, and the DSP 26 is used as an echo canceller.

Figure 5:
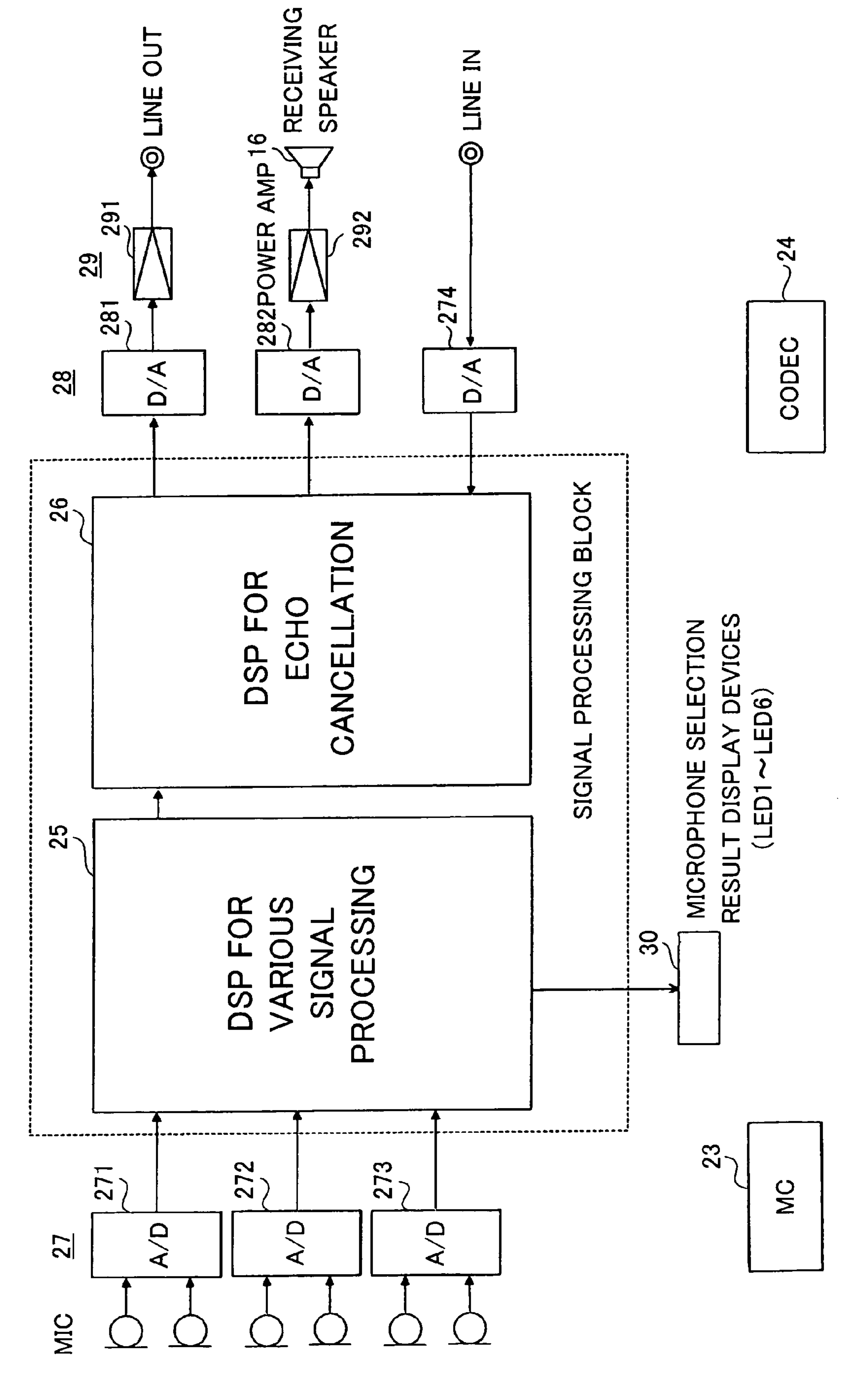
FIG. 5 is a view of connections of principal circuits of the microphone electronic circuit housing and shows the connection configuration of a first digital signal processor (DSP1) and a second digital signal processor (DSP2).

FIG. 5 is a view of the schematic configuration of a microprocessor 23, a codec 24, the DSP 25, the DSP 26, an A/D converter block 27, a D/A converter block 28, an amplifier block 29, and other various types of electronic circuits.

The microprocessor 23 performs the processing for overall control of the microphone electronic circuit housing 2.

The codec 24 encodes the audio signal

The DSP 25 performs the various types of signal processing explained below, for example, the filter processing and the microphone selection processing.

The DSP 26 functions as an echo canceller.

In FIG. 5, as examples of the A/D converter block 27, the A/D converters 271 to 274 are exemplified, as examples of the D/A converter block 28, D/A converters 281 and 282 are exemplified, and as examples of the amplifier block 29, amplifiers 291 and 292 are exemplified.

In addition, as the microphone electronic circuit housing 2, various types of circuits such as a power supply circuit are mounted on the printed circuit board 21.

Pairs of microphones MC1-MC4, MC2-MC5, and MC3-MC6 input two channels of analog signals to the A/D converters 271 to 273 for converting analog signals to digital signals.

Sound pickup signals of the microphones MC1 to MC6 converted at the A/D converters 271 to 273 are input to the DSP 25 where various types of signal processing explained later are carried out.

As one of processing results of the DSP 25, the result of selection of one of the microphones MC1 to MC6 is output to corresponding light emission diode among the light emission diodes LD1 to LED6 as one example of the microphone selection result displaying means 30.

The processing result of the DSP 25 is output to the DSP 26 where the echo cancellation processing is carried out.

The processing results of the DSP 26 are converted to analog signals at the D/A converters 281 and 282. The output from the D/A converter 281 is encoded at the codec 24 according to need, output to the telephone line 920 via the amplifier 291, and output as sound via the receiving and reproduction speaker 16 of the audio responding apparatus 1 disposed in the conference room of the other party.

The output from the D/A converter 282 is output as sound from the receiving and reproduction speaker 16 of this two-way communication apparatus 1 via the amplifier 292. Namely, the conference participants A1 to A6 can also hear audio emitted by the speaking parties in the conference room via the receiving and reproduction speaker 16.

The audio from the two-way communication apparatus 1 disposed in the conference room of the other party is input via the A/D converter 274 to the DSP 26 where it is used for the echo cancellation processing. Further, the audio from the two-way communication apparatus 1 disposed in the conference room of the other party is supplied to the speaker 16 by a not illustrated route and output as sound.

Microphones MC1 to MC6

Figure 6:
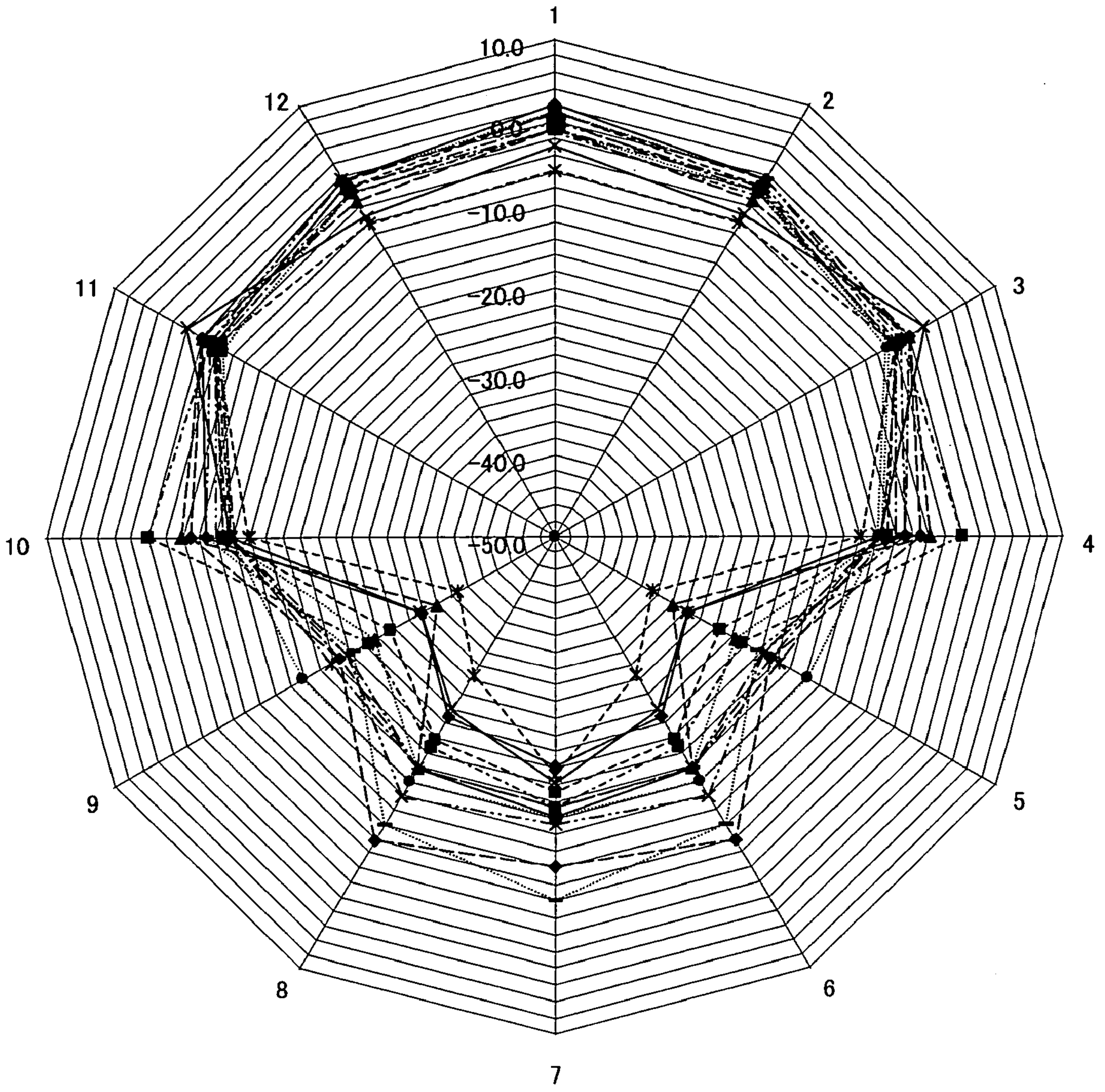
FIG. 6 is a view of the characteristics of the microphones illustrated in FIG. 4.

FIG. 6 is a graph showing the characteristics of the microphones MC1 to MC6.

In each single directivity characteristic microphone, as illustrated in FIG. 6, the frequency characteristic and the level characteristic differ according to the angle of arrival of the audio at the microphone from the speaking party. The plurality of curves indicate directivities when frequencies of the sound pickup signals are 100 Hz, 150 Hz, 200 Hz, 300 Hz, 400 Hz, 500 Hz, 700 Hz, 1000 Hz, 1500 Hz, 2000 Hz, 3000 Hz, 4000 Hz, 5000 Hz, and 7000 Hz.

FIGS. 7A to 7D are graphs showing spectrum analysis results for the position of the sound source and the sound pickup levels of the microphones and show results obtained by placing the speaker at a distance of 1.5 meters from the two-way communication apparatus 1 and applying fast fourier transforms (FFT) to the audio picked up by the microphones at constant time intervals. The X-axis represents the frequency, the Y-axis represents the signal level, and the Z-axis represents the time.

When using microphones having directivity of FIG. 6, a strong directivity is shown at the front surfaces of the microphones. By making good use of such a characteristic, the DSP 25 performs the selection processing of the microphones explained later.

When using microphones not having directivity as in the present invention, in other words, picking up sound (collecting sound) by microphones having no directivity, all sounds around the microphones are picked up, therefore the S/N's (SNR) of the audio of the speaking party with the surrounding noise are mixed, so a good sound cannot be picked up so much. In order to avoid this, in the invention of the present application, by picking up the sounds by a single directivity microphone, the S/N with the surrounding noise is enhanced.

Further, as the method for obtaining the directivity of the microphones, a microphone array using a plurality of non-directivity microphones can be used. With this method, however, processing is required for matching the time axes (phases) of the signals, therefore a long time is taken, the response is low, and the hardware configuration becomes complex. Namely, complex signal processing is required also for the signal processing system of the DSP. The present invention overcomes such a disadvantage.

Also, to combine microphone array signals to utilize microphones as directivity sound pickup microphones, there is the disadvantage that the outer shape is restricted by the pass frequency characteristic and the outer shape becomes large. The present invention also solves this problem.

Effect of Hardware Configuration of Two-way Communication Apparatus

The two-way communication apparatus having the above configuration has the following advantages.

(1) The positional relationships between the plurality of microphones MC1 to MC6 and the receiving and reproduction speaker 16 are constant and further the distances thereof are very close, therefore the level of the sound issued from the receiving and reproduction speaker 16 directly coming back is overwhelmingly larger and dominant than the level of the sound issued from the receiving and reproduction speaker 16 passing through the conference room (room) environment and coming back to the microphones MC1 to MC6. Due to this, the characteristics (signal level intensities, frequency characteristics, phases etc.) of arrival of the sounds from the receiving and reproduction speaker 16 to the microphones MC1 to MC6 are always the same. That is, the two-way communication apparatus 1 has the advantage that the transmission function is always the same.

(2) Therefore, there is the advantage that the transmission function when switching the microphone does not change and it is not necessary to adjust the gain of the microphone system whenever the microphone is switched. In other words, there is the advantage that it is not necessary to re-do the adjustment once adjustment is carried out at the time of manufacture of the present two-way communication apparatus.

(3) Even if switching the microphone for the same reason as above, a single echo canceller (DSP) 26 is sufficient. A DSP is expensive. Also, the space required for arranging the DSP on the printed circuit board 21 on which various members are mounted and having little empty space may be kept small.

(4) Since the transmission functions between the receiving and reproduction speaker 16 and the microphones MC1 to MC6 are constant, there is the advantage for example that adjustment of the sensitivity difference of the microphones per se of ±3 dB can be carried out solely by the unit.

(4) As the table on which the two-way communication apparatus 1 is mounted, usually use is made of a round table. A speaker system for equally dispersing (scattering) audio having an equal quality in all directions by a single receiving and reproduction speaker 16 in the two-way communication apparatus 1 becomes possible.

(5) There is the advantage that the sound output from the receiving and reproduction speaker 16 is propagated through the table surface (boundary effect) and good quality sound effectively arrives at the conference participants equally and with a good efficiency, the sound and the phase of opposite side are cancelled in a ceiling direction of the conference room and become small, there is a little reflected sound from the ceiling direction at the conference participants, and as a result a clear sound is distributed to the participants.

(6) The sound output from the receiving and reproduction speaker 16 arrives at all microphones MC1 to MC6 with the same volume simultaneously, therefore a decision of whether the sound is audio of a speaking party or received audio becomes easy. As a result, erroneous decision in the microphone selection processing is reduced. Details thereof will be explained later.

(7) By arranging an even number of, for example, six, microphones at equal intervals, the level comparison for detecting the direction can be easily carried out.

(8) By the dampers 18, the microphone support members 22*a*, 22*b*, etc., the influence of vibration due to the sound of the receiving and reproduction speaker 16 exerted upon the sound pickup of the microphones MC1 to MC6 can be reduced.

(9) The sound of the receiving and reproduction speaker 16 does not directly enter the microphones MC1 to MC6. Accordingly, in the two-way communication apparatus 1, there is little influence of the noise from the receiving and reproduction speaker 16.

Modification

In the two-way communication apparatus 1 explained referring to FIG. 2 to FIG. 3, the receiving and reproduction speaker 16 was arranged at the lower portion, and the microphones MC1 to MC6 (and related electronic circuits) were arranged at the upper portion, but it is also possible to vertically invert the positions of the receiving and reproduction speaker 16 and the microphones MC1 to MC6 (and related electronic circuits). Even in such a case, the above effects are exhibited.

Naturally the number of microphones is not limited to six. Any even number of microphones may be located on straight lines in the same direction, for example, like the microphones MC1 and MC4.

The reason that two microphones MC1 and MC4 are arranged on a straight line facing each other is for selecting the microphone. Details thereof will be explained later.

Content of Signal Processing

Figure 8:
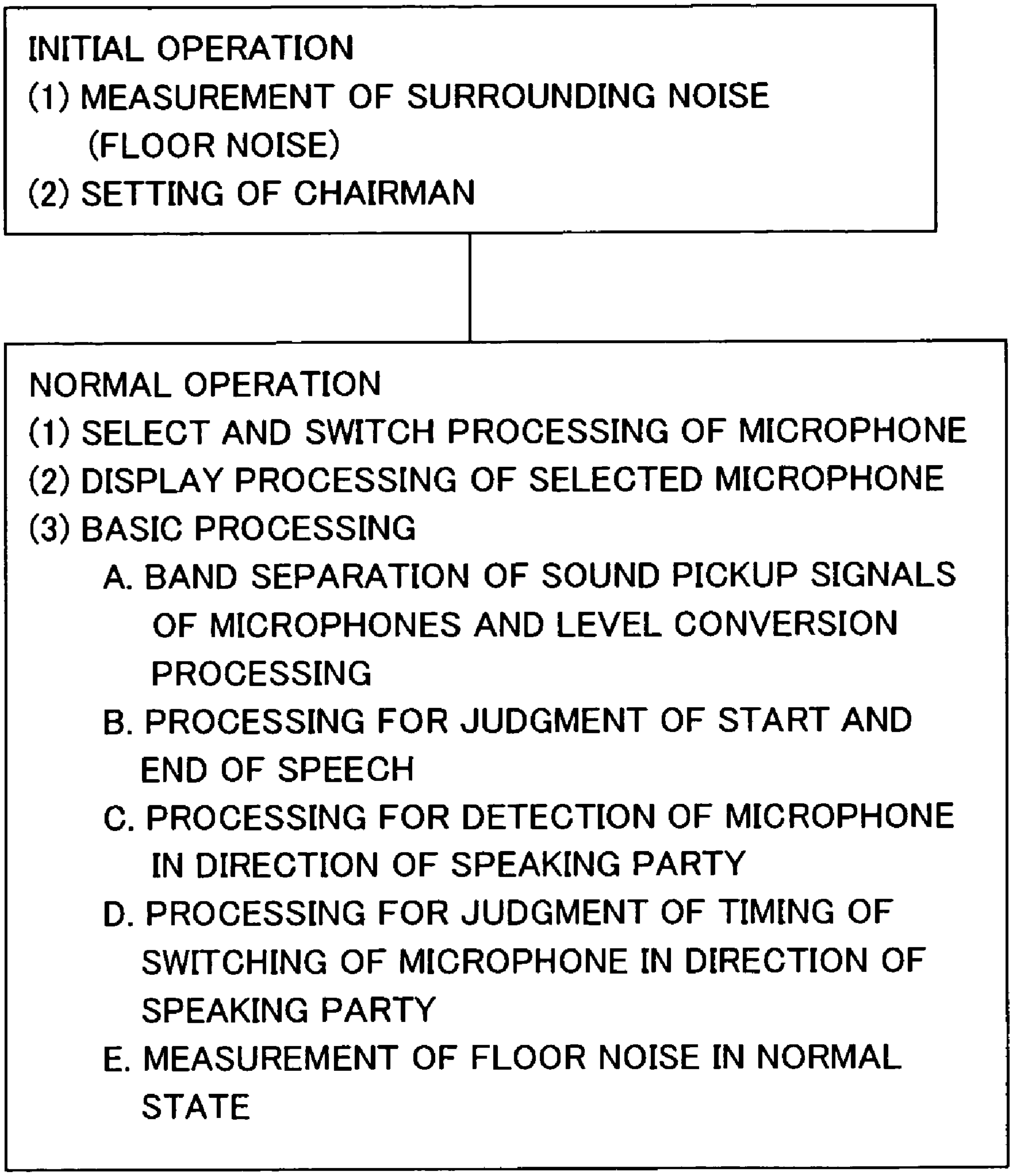
FIG. 8 is a graph schematically showing the overall content of processing in a first digital signal processor (DSP1).

Below, the content of the processing performed mainly by the first digital signal processor (DSP) 25 will be explained. FIG. 8 is a view schematically illustrating the processing performed by the DSP 25. Below, a brief explanation will be given.

(1) Measurement of Surrounding Noise

As an initial operation, the noise of the surroundings where the two-way communication apparatus 1 is disposed is measured.

The two-way communication apparatus 1 can be used in various environments. In order to achieve correct selection of the microphone and raise the performance of the two-way communication apparatus 1, in the present invention, the noise of the surrounding environment where the two-way communication apparatus 1 is disposed is measured to enable elimination of the influence of that noise from the signals picked up at the microphones.

Naturally, when the two-way communication apparatus 1 is repeatedly used in the same conference room, the noise is measured in advance, so this processing can be omitted when the state of the noise does not change.

Note that the noise can also be measured in the normal state. Details thereof will be explained later.

(2) Selection of Chairman

For example, when using the two-way communication apparatus 1 for a two-way conference, it is advantageous if there is a chairman who runs the proceedings in the conference rooms. Accordingly, in the present invention, in the initial stage using the two-way communication apparatus 1, the chairman is set from the operation unit 15 of the two-way communication apparatus 1. The method for setting the chairman in the present embodiment is to set the microphone used by the chairman with priority.

Naturally, when the chairman repeatedly using the two-way communication apparatus 1 is the same, this processing can be omitted.

Note that this processing is carried out when the chairman is changed.

As normal processing, various types of processing exemplified below are carried out.

(3) Processing for Selection and Switching of Microphones

When a plurality of conference participants simultaneously speak in one conference room, the audio is mixed and hard to understand by the conference participants A1 to A6 in the conference room of the other party. Therefore, in the present invention, in principle, only one person is allowed to speak. For this, the DSP 25 performs processing for selecting and switching the microphones.

Only the speech from the selected microphone is transmitted to the audio responding apparatus 1 of the conference room of the other party via the telephone line 920 and output from the speaker.

The object of this processing is to select the signal of the single directivity microphone facing the speaking party and send a signal having a good S/N to the other party as the transmission signal.

(4) Display of Selected Microphone

Which is the microphone of the conference participant selected is made easy to recognize by all of the conference participants A1 to A6 by turning on the corresponding microphone selection result displaying means 30, for example, the corresponding light emission diode among the light emission diodes LED1 to LED6.

(5) As a background art of the above microphone selection processing or in order to correctly execute the processing for the microphone selection, various types of signal processing exemplified below are carried out.

(a) Processing for band separation and level conversion of sound pickup signals of microphones (b) Processing for judgment of start and end of speech For use as a trigger for start of judgment for selection of the signal of the microphone facing the direction of the speaking party.

(c) Processing for detection of the microphone in the direction of the speaking party For analyzing the sound pickup signals of microphones and judging the microphone facing the speaking party.

(d) Processing for judgment of timing of switching of the microphone in the direction of the speaking party, and processing for switching the selection of the signal of the microphone facing the detected speaking party.

For instructing switching to the microphone selected from the above processing results.

(e) Measurement of floor noise at the time of normal operation

Measurement of Floor (Environment) Noise

This processing is divided into initial processing immediately after turning on the power and the normal processing. Note that the processing is carried out under the following typical preconditions.

(1) Condition: Measurement time and threshold provisional value:

1. Test tone sound pressure: −40 dB in terms of microphone signal level

2. Noise measurement unit time: 10 seconds

3.—Noise measurement in normal state: Calculation of mean value by measurement results of 10 seconds further repeated 10 times to find the mean value deemed as the noise level.

(2) Standard and threshold value of valid distance by difference between floor noise and speech start reference level 1. 26 dB or more: 3 meters or more Detection level threshold value of start of speech: Floor noise level+9 dB Detection level threshold value of end of speech: Floor noise level+6 dB 2. 20 to 26 dB: Not more than 3 meters Detection level threshold value of start of speech: Floor noise level+9 dB Detection level threshold value of end of speech: Floor noise level+6 dB 3. 14 to 20 dB: Not more than 1.5 meters Detection level threshold value of start of speech: Floor noise level+9 dB Detection level threshold value of end of speech: Floor noise level+6 dB 4. 9 to 14 dB: Not more than 1 meter Detection level threshold value of start of speech:

Difference between floor noise level and speech start reference level÷2+2 dB

Detection level threshold value of end of speech: speech start threshold value−3 dB 5. 9 dB or less: Several tens OF centimeters Detection level threshold value of start of speech:

6. Difference between floor noise level and speech start reference level÷2

Detection level threshold value of end of speech: −3 dB

7. Same or minus: Cannot be judged, selection prohibited (3) The noise measurement start threshold value of the normal processing is started when the level of the floor noise+3 dB when turning on the power supply is obtained.

Figure 10:
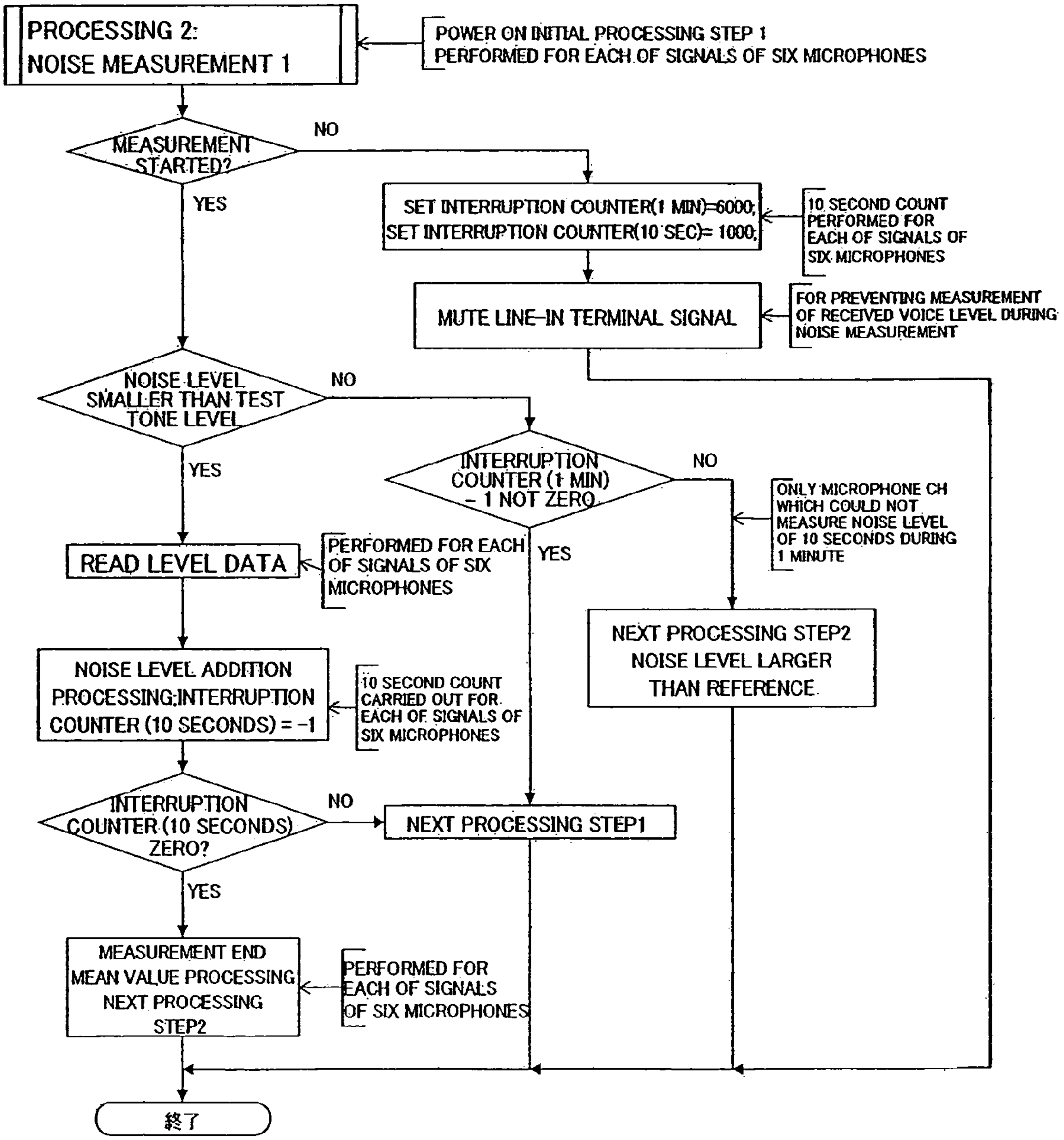
FIG. 10 is a flow chart of a second aspect of the noise measurement method in the present invention.
Figure 11:
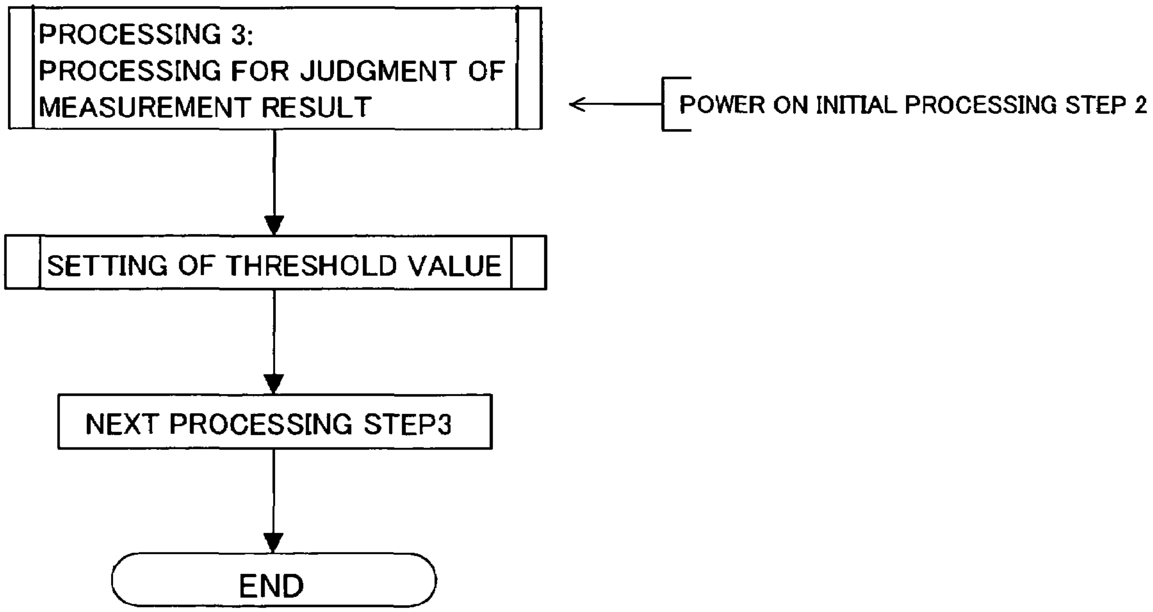
FIG. 11 is a flow chart of a third aspect of the noise measurement method in the present invention.
Figure 12:
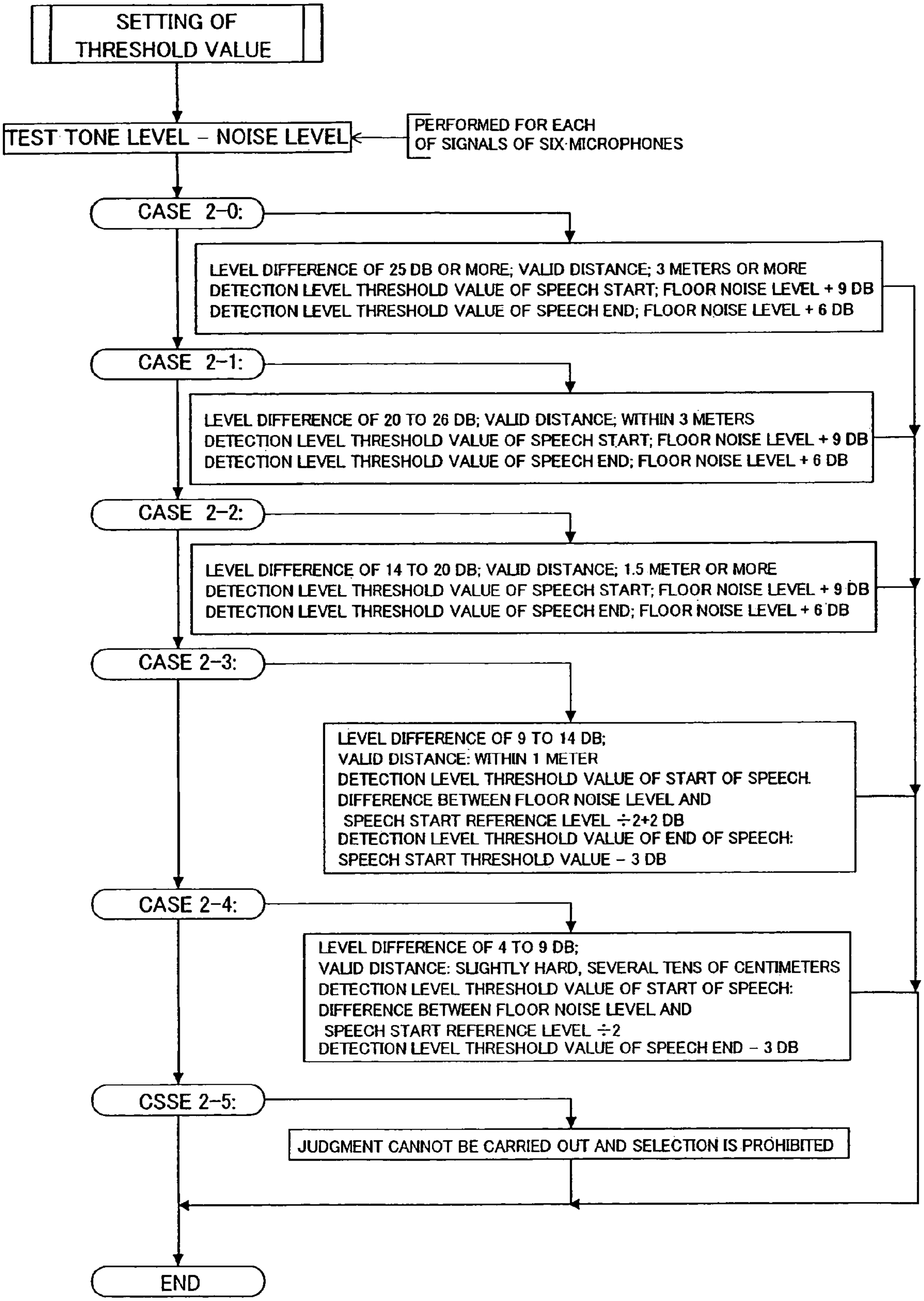
FIG. 12 is a flow chart of a fourth aspect of the noise measurement method in the present invention.

Immediately after turning on the power of the two-way communication apparatus 1, the two-way communication apparatus 1 performs the following noise measurement explained by referring to FIG. 10 to FIG. 12.

The initial processing of the two-way communication apparatus 1 immediately after turning on the power is carried out in order to measure the floor noise and the reference signal level and to set the standard of the valid distance between the speaking party and the present system and the speech start and end judgment threshold value levels based on the difference.

The level value peak held by the sound pressure level detection unit is read out at constant time intervals, for example 10 msec, to calculate the mean value of the values of the unit time which is then deemed as the floor noise. Then, this determines the threshold values of the detection level of the start of the speech and the detection level of the end of the speech based on the measured floor noise level.

Figure 9:
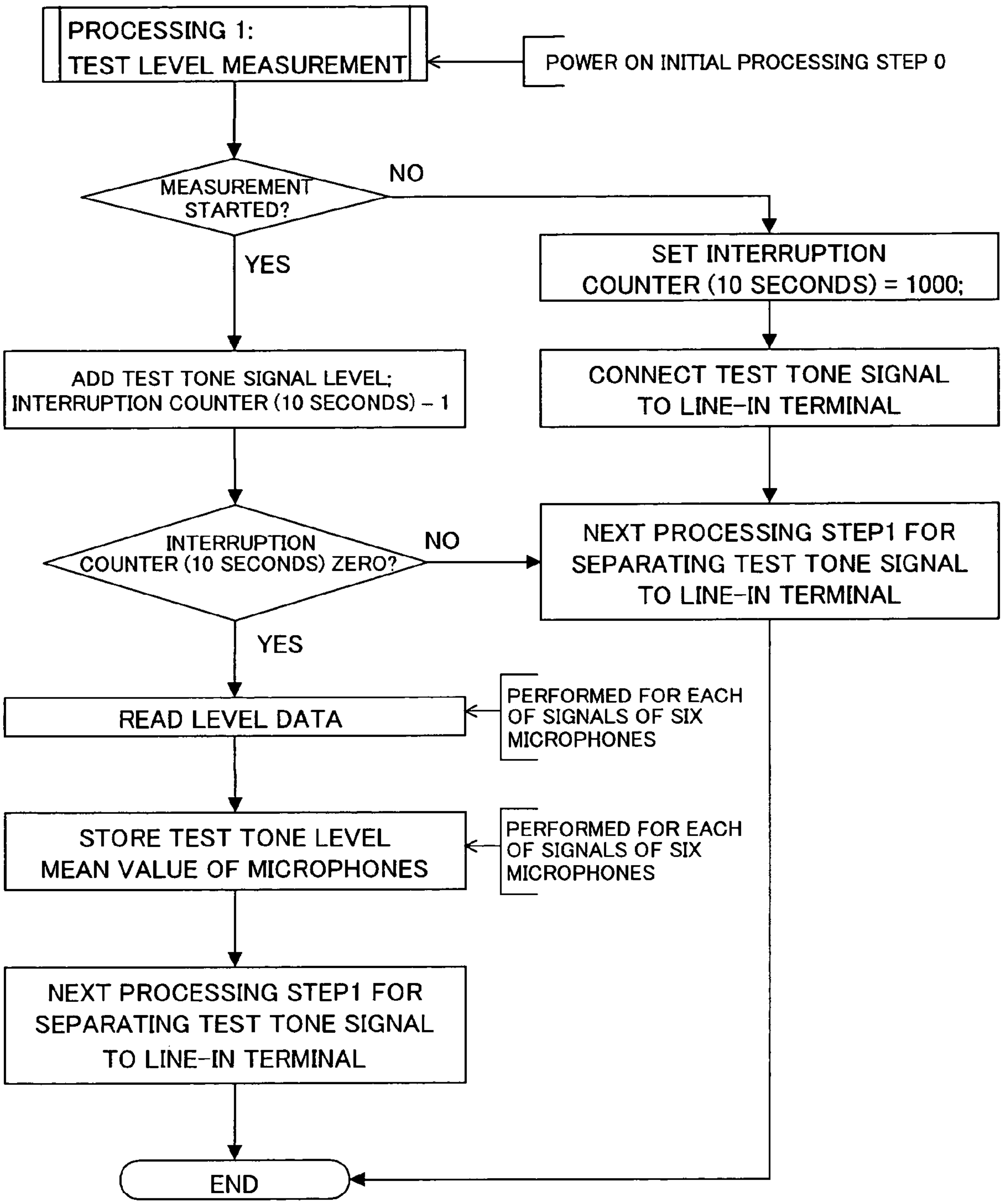
FIG. 9 is a flow chart of a first aspect of a noise measurement method in the present invention.

FIG. 9, processing 1: Test level measurement

The DSP 25 outputs a test tone to the input terminal of the reception signal system illustrated in FIG. 5, picks up the sound from the receiving and reproduction speaker 16 at the microphones MC1 to MC6, and uses the signal as the speech start reference level to find the mean value.

FIG. 10, processing 2: Noise measurement 1

The DSP 25 collects the levels of the sound pickup signals from the microphones MC1 to MC6 for a constant time as the floor noise level and finds the mean value.

FIG. 11, processing 3: Trial calculation of valid distance

The DSP 25 compares the speech start reference level and the floor noise level, estimates the noise level of the room such as the conference room in which the two-way communication apparatus 1 is disposed, and calculates the valid distance between the speaking party and the present two-way communication apparatus 1 with which the present two-way communication apparatus 1 works well.

Judgment of Prohibition of Microphone Selection

Note that when the result of the processing 3 is that the floor noise is larger (higher) than the speech start reference level, the DSP 25 judges that there is a strong noise source in the direction of the microphone, sets the automatic selection state of the microphone in that direction to "prohibit", and displays that on for example the microphone selection result displaying means 30 or the operation unit 15.

Determination of Threshold Value

The DSP 25 compares the speech start reference level and the floor noise level as illustrated in FIG. 12 and determines the threshold values of the speech start and end levels from the difference.

Concerning the noise measurement, the next processing is the normal processing, so the DSP 25 sets each timer (counter) and prepares for the next processing.

Normal Noise Processing

Figure 13:
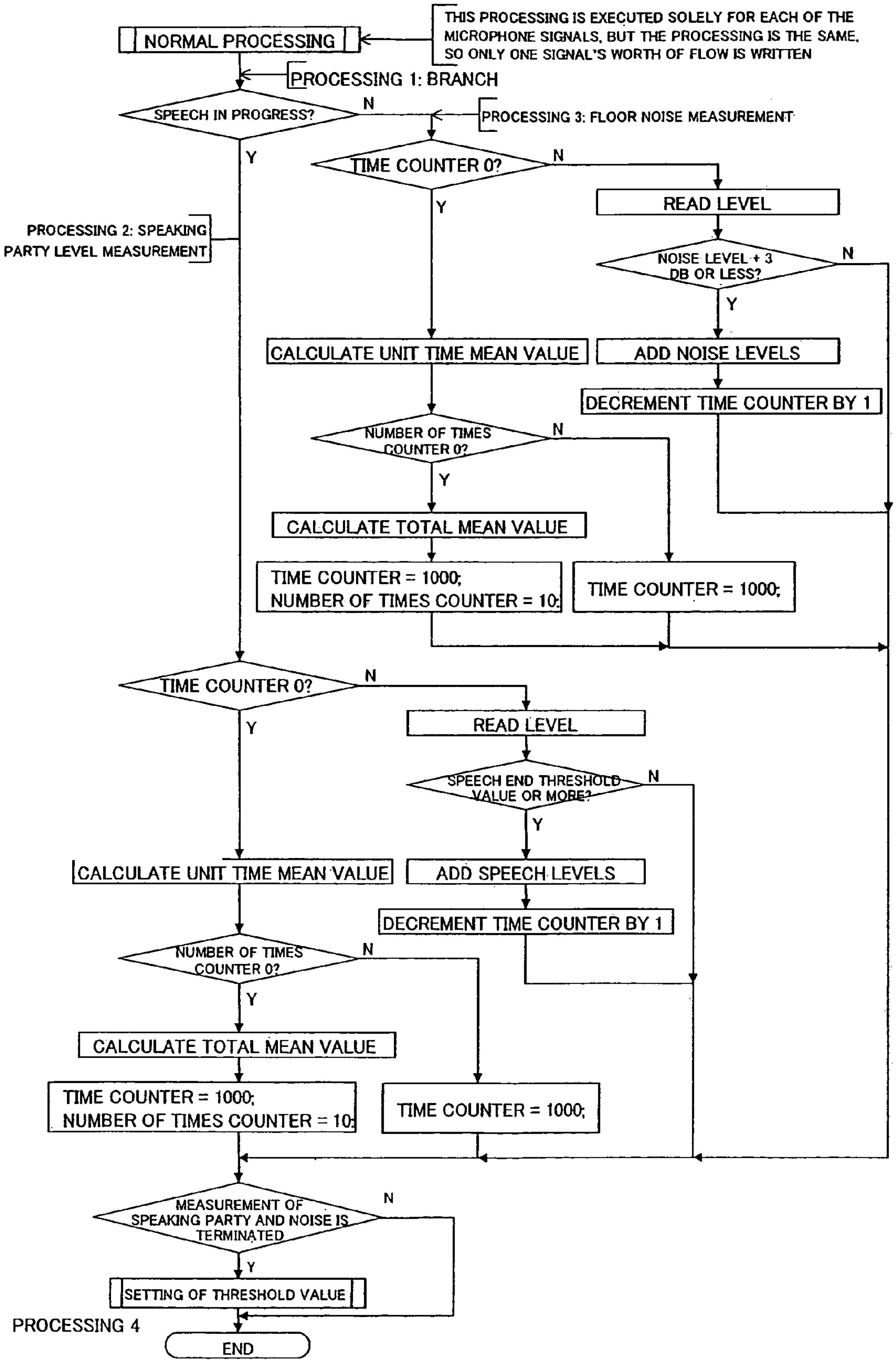
FIG. 13 is a flow chart of a fifth aspect of the noise measurement method in the present invention.

The DSP 25 performs the noise processing according to the processing of flow chart shown in FIG. 13 in the normal operation state even after the above noise measurement at the initial operation, measures the mean value of the volume level of the speaking party selected for each of the six microphones MC1 to MC6 and the noise level after detecting the end of speech, and resets the speech start and end judgment threshold value levels in units of constant times.

FIG. 13, processing 1: The DSP 25 decides to branch to the processing 2 or the processing 3 by deciding whether speech is in progress or speech has ended.

FIG. 13, processing 2: Speaking party level measurement

The DSP 25 averages the level data in a unit time, for example, an amount of 10 seconds, during speech 10 times, and records the same as the speaking party level.

When the speech is ended in the unit time, the time count and the speech level measurement are suspended until the start of new speech. After detecting new speech, the measurement processing is restarted.

FIG. 13, processing 3: Noise measurement 2

The DSP 25 averages the noise level data of the unit time when the end of speech is detected to when speech is started, for example, an amount of 10 seconds 10 times, and records the same as the floor noise level.

When there is new speech in the unit time, the DSP 25 suspends the time count and noise measurement in the middle and, after detecting the end of the new speech, restarts the measurement processing.

FIG. 13, processing 4: Threshold value determination 2

The DSP 25 compares the speech level and the floor noise level and determines the threshold values of the speech start and end levels from the difference.

Note that the mean value of the speech level of a speaking party is found for use for other than the above, therefore it is also possible to set the speech start and end detection threshold levels unique to the speaking party facing a microphone.

Generation of Various Types of Frequency Component Signals by Filter Processing

Figure 14:
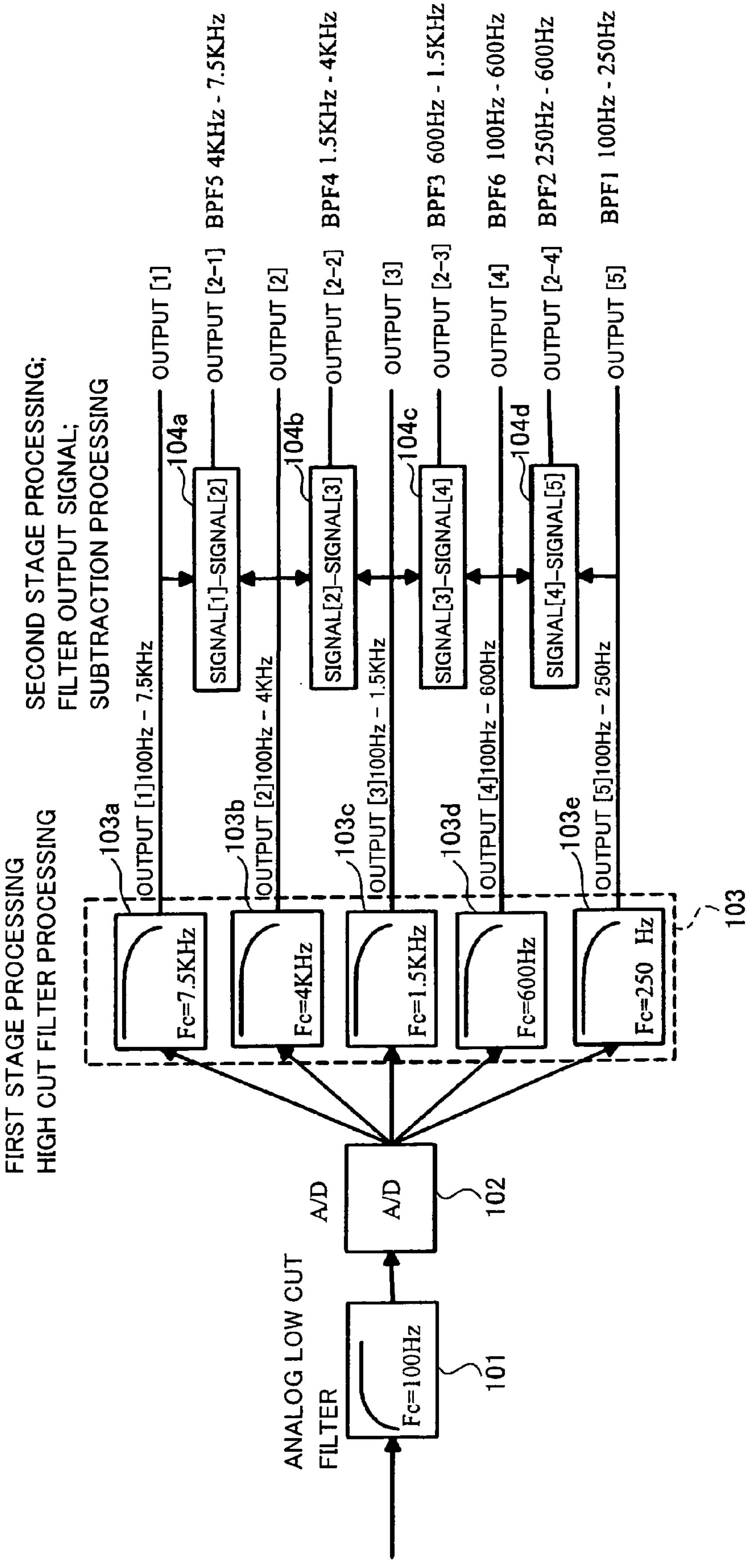
FIG. 14 is a view of filter processing in the two-way communication apparatus of the present invention.

FIG. 14 is a view of the configuration showing the filter processing performed at the DSP 25 using the sound signals picked up by the microphones as pre-processing.

Note that, FIG. 14 shows the processing for one channel (one sound pickup signal).

The sound pickup signals of microphones are processed at an analog low cut filter 101 having a cut-off frequency of for example 100 Hz and output to the A/D converter 102. The sound pickup signals converted to the digital signals at the A/D converter 102 are stripped of their high frequency components at the digital high cut filters 103*a* to 103*e* (referred to overall as 103) having cut-off frequencies of 7.5 kHz, 4 kHz, 1.5 kHz, 600 Hz, and 250 Hz (high cut processing). The results from the digital high cut filters 103*a* to 103*e* are further subtracted by the filter signals of the adjacent digital high cut filters 103*a* to 103*e* in the subtracters 104*a* to 104*d* (referred to overall as 104).

In this embodiment of the present invention, the digital high cut filters 103*a* to 103*e* and the subtracters 104*a* to 104*e* are actually realized by processing in the DSP 25. The A/D converter 102 can be realized as part of the A/D converter block 27.

Figure 15:
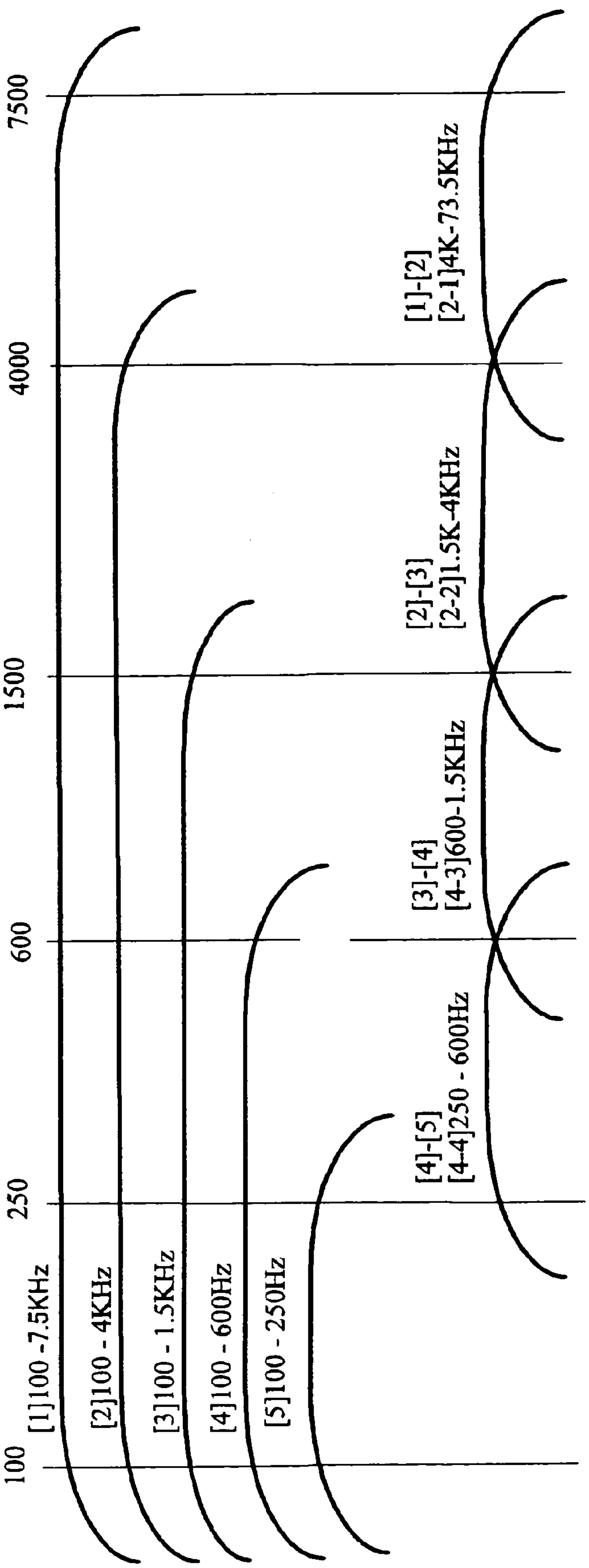
FIG. 15 is a view of a frequency characteristic of processing results of FIG. 14.

FIG. 15 is a view of the frequency characteristic showing the filter processing result explained by referring to FIG. 14. In this way, a plurality of signals having various types of frequency components are generated from signals picked up by one microphone.

Band-Pass Filter Processing and Microphone Signal Level Conversion Processing

As one of the triggers for start of the microphone selection processing, the start and end of the speech are judged. The signal used for this is obtained by the bandpass filter processing and the level conversion processing illustrated in FIG. 16.

Figure 16:
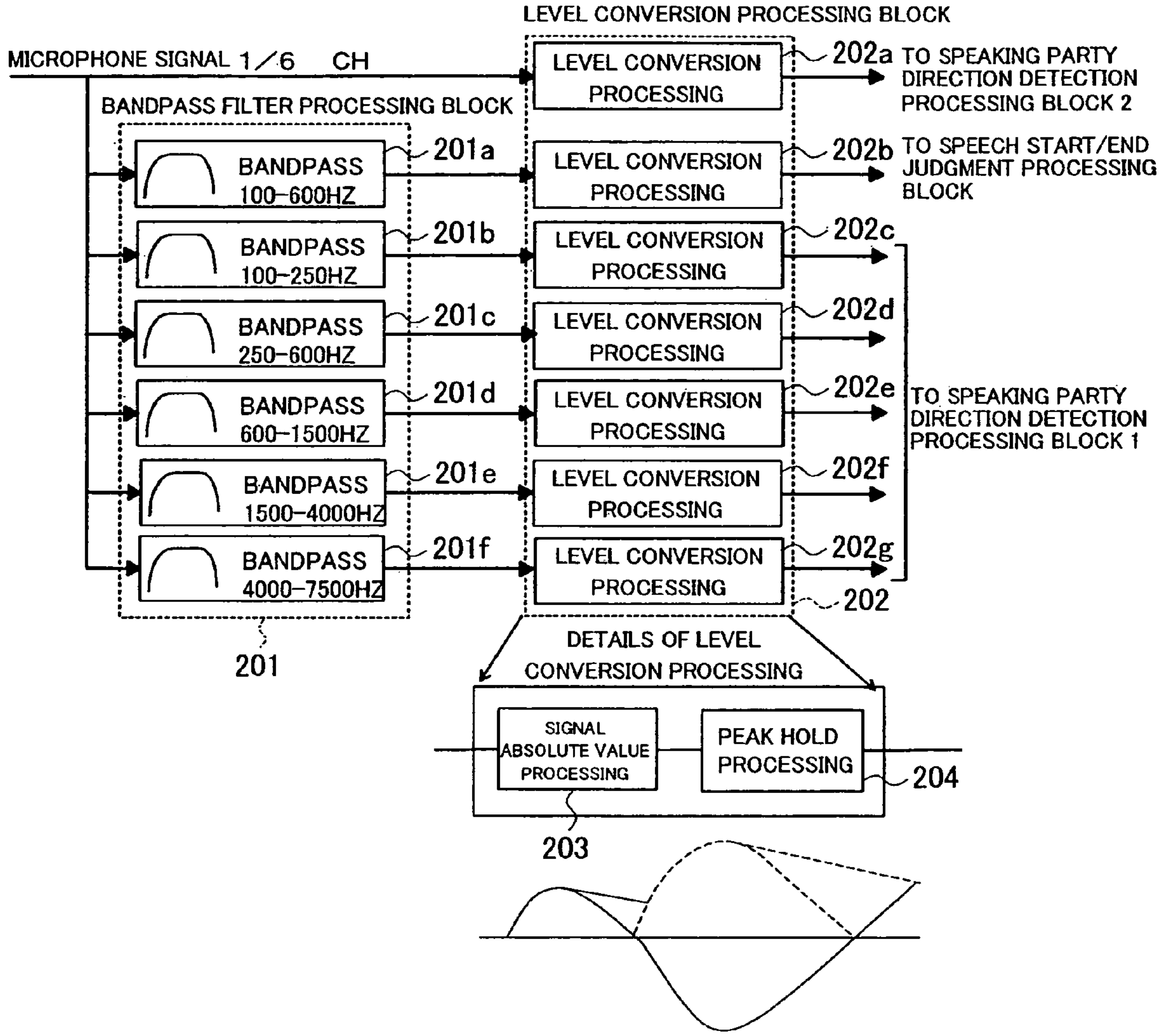
FIG. 16 is a block diagram of band pass filter processing and level conversion processing of the present invention.

FIG. 16 shows only 1CH during the input signal processing of six channels (CH) picked up at the microphones MC1 to MC6.

The bandpass filter processing and level conversion processing circuits have, for the sound pickup signals of the microphones, bandpass filters 201*a* to 201*e* (referred to overall as the "bandpass filter block 201") having bandpass characteristics of 100 to 600 Hz, 100 to 250 Hz, 250 to 600 Hz, 600 to 1500 Hz, 1500 to 4000 Hz, and 4000 to 7500 Hz and level converters 202*a* to 202*g* (referred to overall as the "level converter block 202") for converting the levels of the original microphone sound pickup signals and the band-passed sound pickup signals.

Each of the level conversion units has a signal absolute value processing unit 203 and a peak hold processing unit 204. Accordingly, as exemplified in the waveform diagram, the signal absolute value processing unit 203 inverts the sign when receiving as input a negative signal indicated by a broken line to convert the same to a positive signal. The peak hold processing unit 204 holds the maximum value of the output signals of the signal absolute value processing unit 203. Note that in the present embodiment, the held maximum value drops a little along with the elapse of time. Naturally, it is also possible to improve the peak hold processing unit 204 to enable the maximum value to be held for a long time.

The bandpass filter will be explained next.

The bandpass filter used in the two-way communication apparatus 1 is for example comprised of just a secondary IIR high cut filter and a low cut filter of the microphone signal input stage.

The present embodiment utilizes the fact that if a signal passed through the high cut filter is subtracted from a signal 1 having a flat frequency characteristic, the remainder becomes substantially equivalent to a signal passed through the low cut filter.

In order to match the frequency-level characteristics, one extra band of the bandpass filters of the full bandpass becomes necessary. The required bandpass is obtained by the number of bands and filter coefficients of the number of bands of the bandpass filters+1.

The band frequency of the bandpass filter required this time is the following six bands of bandpass filters per 1 CH of the microphone signal:

BPF1=[100 Hz–250 Hz] . . . 201*b*
BPF2=[250 Hz–600 Hz] . . . 201*c*
BPF3=[600 Hz–1.5 kHz] . . . 201*d*
BPF4=[1.5 kHz–4 kHz] . . . 201*e*
BPF5=[4 kHz–7.5 kHz] . . . 201*f*
BPF6=[100 Hz–600 Hz] . . . 201*a*

In this method, the computation program of the IIR filters is only 6 CH×5 (IIR filter)=30.

Compare this with the configuration of conventional bandpass filters.

If configuring the bandpass filters using secondary IIR filters and preparing six bands of bandpass filters for six microphone signals as in the present invention, the IIR filter processing of 6×6×2=72 circuits becomes necessary. This processing requires considerable program processing even by the newest excellent DSP and exerts an influence upon the other processing.

In the present invention, 100 Hz low cut filter processing is realized by the analog filters of the input stage. There are five cut-off frequencies of the prepared secondary IIR high cut filters: 250 Hz, 600 Hz, 1.5 kHz, 4 kHz, and 7.5 kHz. The high cut filter having the cut-off frequency of 7.5 kHz among them actually has a sampling frequency of 16 kHz, so is unnecessary, but the phase of the subtracted number is intentionally rotated (the phase is changed) in order to reduce the phenomenon of the output level of the bandpass filter being reduced due to the influence by the phase rotation of the IIR filter in the step of the subtraction processing.

Figure 17:
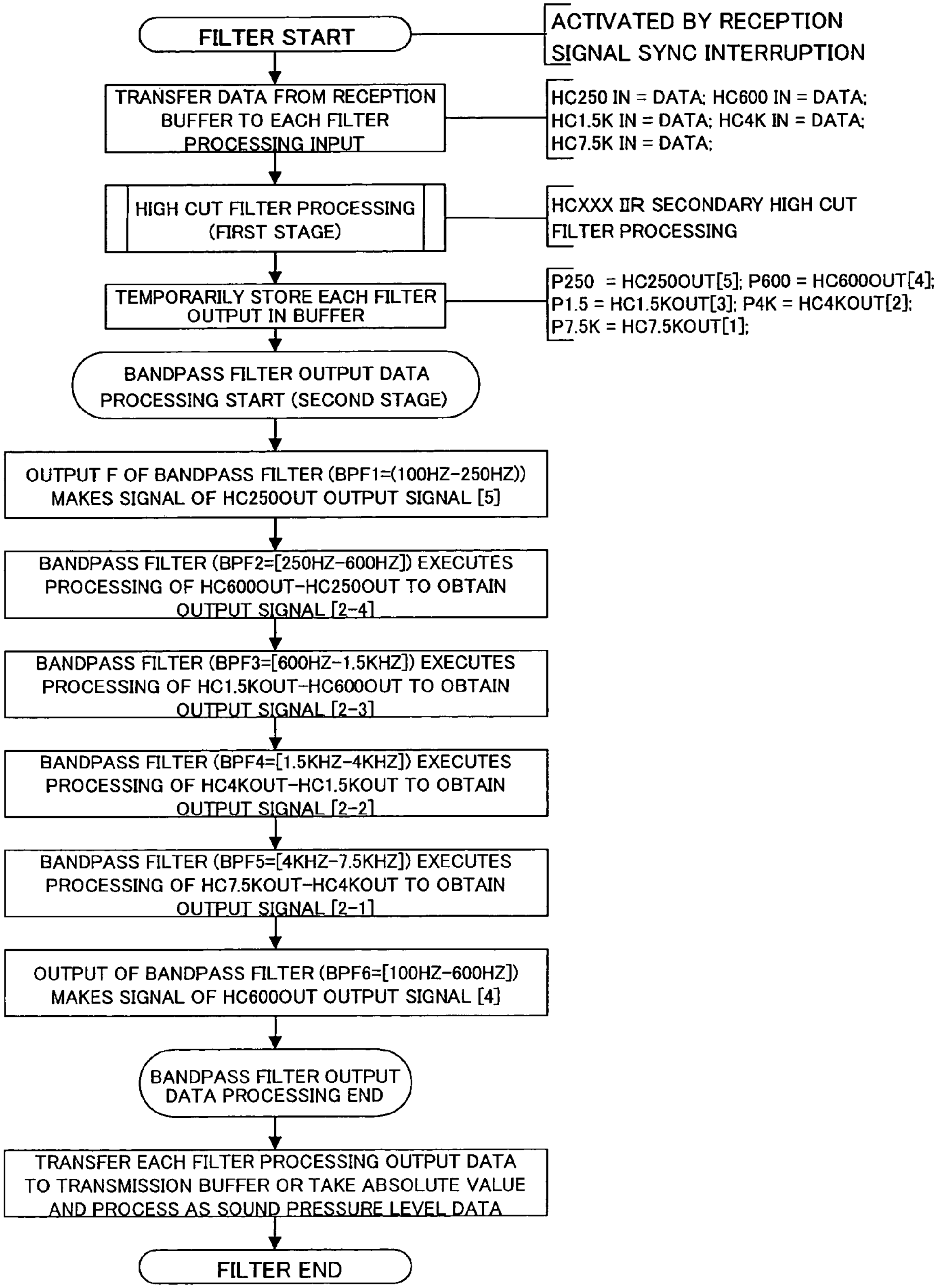
FIG. 17 is a flow chart of the processing of FIG. 16.

FIG. 17 is a flow chart of the processing by the configuration illustrated in FIG. 16 at the DSP 25.

In the filter processing illustrated in FIG. 17, the high pass filter processing is carried out as the first stage of processing, while the subtraction processing from the result of the first stage of the high pass filter processing is carried out as the second stage of processing. FIG. 15 is a view of the image frequency characteristics of the results of the signal processing.

First Stage

1. For the full bandpass filter, the input signal is passed through the 7.5 kHz high cut filter. This filter output signal becomes the bandpass filter output of [100 Hz–7.5 kHz] by combination with the input analog low cut filter.

2. The input signal is passed through the 4 kHz high cut filter. This filter output signal becomes the bandpass filter output of [100 Hz–4 kHz] by combination with the input analog low cut filter.

3. The input signal is passed through the 1.5 kHz high cut filter. This filter output signal becomes the bandpass filter output of [100 Hz–1.5 kHz] by combination with the input analog low cut filter.

4. The input signal is passed through the 600 kHz high cut filter. This filter output signal becomes the bandpass filter output of [100 Hz–600 Hz] by combination with the input analog low cut filter.

5. The input signal is passed through the 250 kHz high cut filter. This filter output signal becomes the bandpass filter output of [100 Hz–250 Hz] by combination with the input analog low cut filter.

Second Stage

1. When the bandpass filter (BPF5=[4 kHz to 7.5 kHz]) executes the processing of the filter output [1]-[2] ([100 Hz to 7.5 kHz]–[100 Hz to 4 kHz]), the above signal output [4 kHz to 7.5 kHz] is obtained.

2. When the bandpass filter (BPF4=[1.5 kHz to 4 kHz]) executes the processing of the filter output [2]-[3] ([100 Hz to 4 kHz]–[100 Hz to 1.5 kHz]), the above signal output [1.5 kHz to 4 kHz] is obtained.

3. When the bandpass filter (BPF3=[60 Hz to 1.5 kHz]) executes the processing of the filter output [3]-[4] ([100 Hz to 1.5 kHz]–[100 Hz to 600 Hz]), the above signal output [600 Hz to 1.5 kHz] is obtained.

4. When the bandpass filter (BPF2=[250 Hz to 600 Hz]) executes the processing of the filter output [4]-[5] ([100 Hz to 600 Hz]–[100 Hz to 250 Hz]), the above signal output [250 Hz to 600 Hz] is obtained.

5. The bandpass filter (BPF1=[100 Hz to 250 Hz]) defines the signal of the above [5] as is as the output signal of the above [5].

6. The bandpass filter (BPF6=[100 Hz to 600 Hz]) defines the signal of the above [4] as is as the output signal of the above [4].

The required bandpass filter output is obtained by the above processing.

The input sound pickup signals MIC1 to MIC6 of the microphones are constantly updated as in Table 1 as the sound pressure level of the entire band and the six bands of sound pressure levels passed through the bandpass filter in the DSP 25.

TABLE 1

| | BPF1 | BPF2 | BPF3 | BPF4 | BPF5 | BPF6 | ALL |
|---|---|---|---|---|---|---|---|
| MIC1 | L1-1 | L1-2 | L1-3 | L1-4 | L1-5 | L1-6 | L1-A |
| MIC2 | L2-1 | L2-2 | L2-3 | L2-4 | L2-5 | L2-6 | L2-A |
| MIC3 | L3-1 | L3-2 | L3-3 | L3-4 | L3-5 | L3-6 | L3-A |
| MIC4 | L4-1 | L4-2 | L4-3 | L4-4 | L4-5 | L4-6 | L4-A |
| MIC5 | L5-1 | L5-2 | L5-3 | L5-4 | L5-5 | L5-6 | L5-A |
| MIC6 | L6-1 | L6-2 | L6-3 | L6-4 | L6-5 | L6-6 | L6-A |

Results of Conversion of Signal Levels

In Table 1, for example, L1-1 indicates the peak level when the sound pickup signal of the microphone MC1 passes through the first bandpass filter 201*a*.

In the judgment of the start and end of speech, use is made of the microphone sound pickup signal passed through the 100 Hz to 600 Hz bandpass filter 201*a* illustrated in FIG. 16 and converted in sound pressure level at the level conversion unit 202*b*.

Note that, a conventional bandpass filter is configured by combining a high pass filter and low pass filter for each stage of the bandpass filter. Therefore filter processing of 72 circuits would become necessary if constructing 36 circuits of bandpass filters based on the specification used in the present embodiment. As opposed to this, the filter configuration of the embodiment of the present invention becomes simple.

Processing for Judgment of Start and End of Speech

Figure 18:
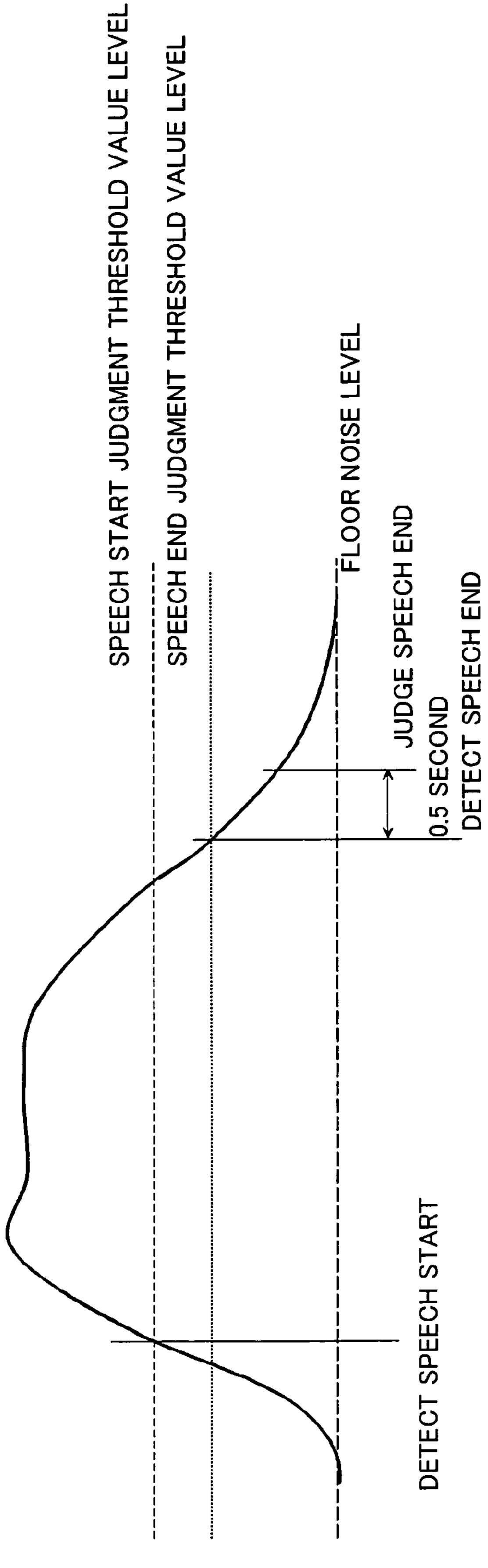
FIG. 18 is a graph showing processing for judging a start and an end of speech in the two-way communication apparatus of the present invention.

Based on the value output from the sound pressure level detection unit, as illustrated in FIG. 18, the DSP 25 judges the start of speech when the microphone sound pickup signal level rises over the floor noise and exceeds the threshold value of the speech start level, judges speech is in progress when a level higher than the threshold value of the start level continues after that, judges there is floor noise when the level falls below the threshold value of the end of speech, and judges the end of speech when the level continues for the constant time, for example, 0.5 second.

The start and end judgment of speech judges the start of speech from the time when the sound pressure level data (microphone signal level (1)) passing through the 100 Hz to 600 Hz bandpass filter and converted in sound pressure level at the microphone signal conversion processing unit 202*b* illustrated in FIG. 16 becomes higher than the threshold value level illustrated in FIG. 18.

Also, the DSP 25 is designed not to detect the start of the next speech during 0.5 second after detecting the start of speech in order to avoid the malfunctions accompanying frequent switching of the microphones.

Microphone Selection

The DSP 25 detects the direction of the speaking party in the mutual speech system and automatically selects the signal of the microphone facing the speaking party based on the system of comparing a microphone signal in intensity with other microphone signals one by one and selecting the microphone signal having the higher signal intensity, that is, the so-called "score card system".

Figure 19:
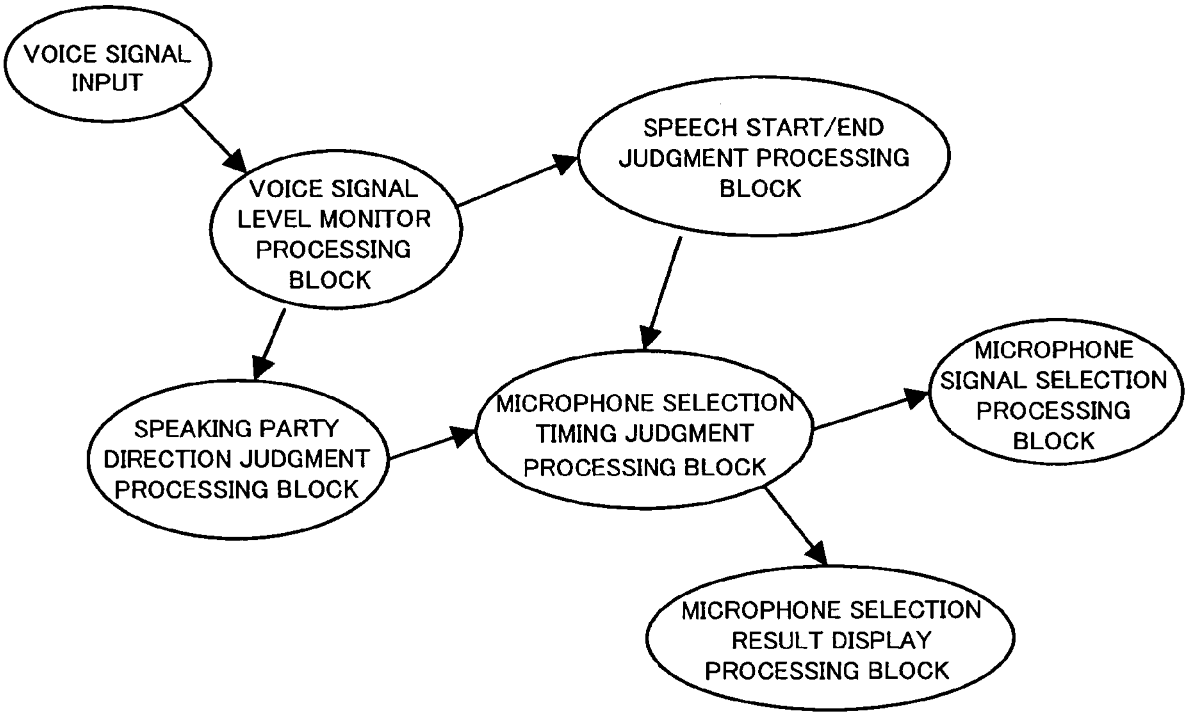
FIG. 19 is a graph of the flow of normal processing in the two-way communication apparatus of the present invention.

FIG. 19 is a graph illustrating the types of operation of the two-way communication apparatus 1.

Figure 20:
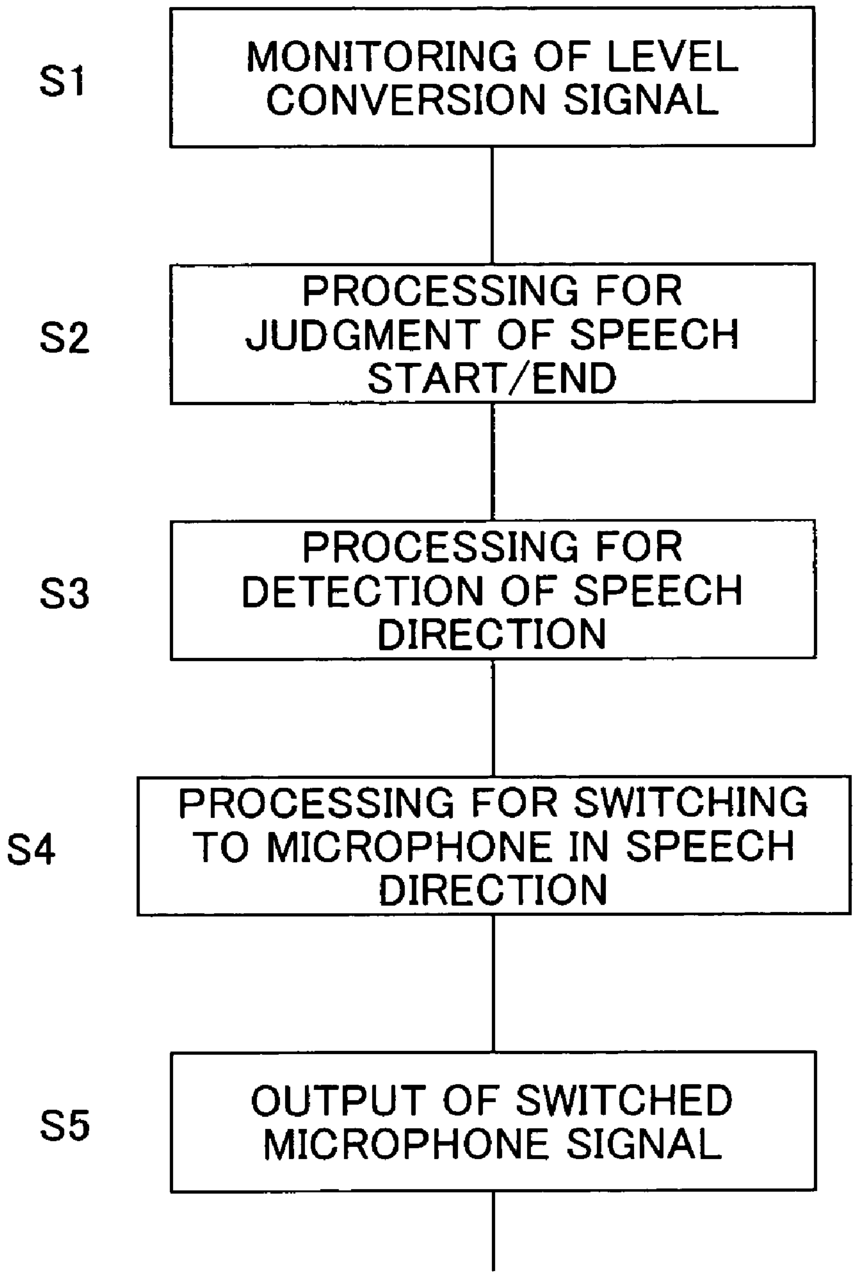
FIG. 20 is a flow chart of the flow of normal processing in the two-way communication apparatus of the present invention.

FIG. 20 is a flow chart showing the normal processing of the two-way communication apparatus 1.

The two-way communication apparatus 1, as illustrated in FIG. 19, performs processing for monitoring the audio signal in accordance with the sound pickup signals from the microphones MC1 to MC6, judges the speech start/end, judges the speech direction, and selects the microphone and displays the results on the microphone selection result displaying means 30, for example, the light emission diodes LED1 to LED6.

Below, a description will be given of the operation mainly using the DSP 25 in the two-way communication apparatus 1 by referring to the flow chart of FIG. 20. Note that the overall control of the microphone electronic circuit housing 2 is carried out by the microprocessor 23, but the description will be given focusing on the processing of the DSP 25.

Step 1: Monitoring of level conversion signal

The signals picked up at the microphones MC1 to MC6 are converted as seven types of level data in the bandpass filter block 201 and the level conversion block 202 explained by referring to FIG. 16, so the DSP 25 constantly monitors seven types of signals for the microphone sound pickup signals.

Based on the monitor results, the DSP 25 shifts to either processing of the speaking party direction detection processing 1, the speaking party direction detection processing 2, or the speech start end judgment processing.

Step 2: Processing for judgment of speech start/end

The DSP 25 judges the start and end of speech by referring to FIG. 18 and further according to the method explained in detail below. When detecting the start of speech as processing, the DSP 25 informs the detection of the speech start to the speaking party direction judgment processing of step 4.

Note that, in the processing for judgment of the start and end of speech at step 2, when the speech level becomes smaller than the speech end level, the timer of 0.5 second is activated. When the speech level is smaller than the speech end level during 0.5 second, it is judged that the speech has ended.

When it becomes larger than the speech end level during 0.5 second, the wait processing is entered until it becomes smaller than the speech end level again.

Step 3: Processing for detection of speaking party direction

The processing for detection of the speaking party direction in the DSP 25 is carried out by constantly continuously searching for the speaking party direction. Thereafter, the data is supplied to the processing for judgment of the speaking party direction of step 4.

Details of this processing for detection of the speaking party direction will be explained later.

Step 4: Processing for switching of speaking party direction microphone

The processing for judgment of timing in the processing for switching the speaking party direction microphone in the DSP 25 instructs the selection of a microphone in a new speaking party direction to the processing for switching the microphone signal of step 4 when the results of the processing of step 2 and the processing of step 3 are that the speaking party detection direction at that time and the speaking party direction which has been selected up to now are different.

Note that when the chairman's microphone has been set from the operation unit 15 and the chairman's microphone and other conference participants simultaneously speak, priority is given to the speech of the chairman.

At this time, the selected microphone information is displayed on the microphone selection result displaying means 30, for example, the light emission diodes LED1 to LED6.

Step 5: Transmission of microphone sound pickup signals

The processing for switching the microphone signal transmits only the microphone signal selected by the processing of step 4 from among the six microphone signals as the transmission signal from the two-way communication apparatus 1 to the two-way communication apparatus of the other party via the telephone line 920, so outputs it to the line-out terminal illustrated in FIG. 5.

Setting of Speech Start Level Threshold Value and Speech End Threshold Value

Processing 1: One second's worth of floor noise is measured for each microphone immediately after turning on the power.

The DSP 25 reads out the peak held level values of the sound pressure level detection unit at constant time intervals, for example intervals of 10 msec in the present embodiment, calculates the mean value for one minute, and defines it as the floor noise.

The DSP 25 determines the threshold value of the detection level of the speech start (floor noise+9 dB) and the threshold value of the detection level of the speech end (floor noise+6 dB) based on the measured floor noise level. The DSP 25 reads out the peak held level values of the sound pressure level detector at constant time intervals even after that.

When it judges the end of speech, the DSP 25 acts for measuring the floor noise, detects the start of speech, and updates the threshold value of the detection level of the end of speech.

According to this method, since floor noise levels of the positions where microphones are placed differ from each other, this threshold value setting can set each threshold value for each microphone and can prevent erroneous judgment due to a noise sound source.

Processing 2: Correspondence to room of surrounding noise (having large floor noise)

When the floor noise is large and the threshold level is automatically updated in the processing 1, the processing 2 performs the following as a countermeasure when detection of the start or end of speech is hard.

The DSP 25 determines the threshold values of the detection level of the start of speech and the detection level of the end of speech based on the predicted floor noise level.

The DSP 25 sets the speech start threshold value level larger than the speech end threshold value level (a difference of for example 3 dB or more).

The DSP 25 reads out the peak held level values at constant time intervals by the sound pressure level detector.

According to this method, since the threshold value is the same value with respect to all microphones, this threshold value setting enables speech start to be recognized by the magnitudes of the voices of persons with their backs to the noise source and the voices of other persons being the same degree.

Judgment of Speech Start

Processing 1: The output levels of the sound pressure level detector corresponding to the microphones and the threshold value of the speech start level are compared. The start of speech is judged when the output level exceeds the threshold value of the speech start level.

When the output levels of the sound pressure level detector corresponding to all microphones exceed the threshold value of the speech start level, the DSP 25 judges the signal to be from the receiving and reproduction speaker 16 and does not judge that speech has started. This is because the distances between the receiving and reproduction speaker 16 and the microphones MC1 to MC6 are the same, so the sound from the receiving and reproduction speaker 16 reaches all microphones MC1 to MC6 substantially equally.

Processing 2: Three sets of microphones each comprised of two single directivity microphones (microphones MC1 and MC4, microphones MC2 and MC5, and microphones MC3 and MC6) obtained by arranging the microphones illustrated in FIG. 4 and having directivity axes shifted by 180 degrees in opposite directions are prepared, and the level differences of two microphone (mike) signals are utilized. Namely, the following operations are executed:

Absolute value of signal level of MIC 1−signal level of MIC 4 [1]

Absolute value of signal level of MIC 2−signal level of MIC 5 [2]

Absolute value of signal level of MIC 3−signal level of MIC 6 [3]

The DSP 25 compares the above absolute values [1], [2], and [3] with the threshold value of the speech start level and judges the speech start when the absolute value exceeds the threshold value of the speech start level.

In the case of this processing, all absolute values do not become larger than the threshold value of the speech start level unlike the processing 1 (since sound from the receiving and reproduction speaker 16 equally reaches all microphones), so judgment of whether the sound is from the receiving and reproduction speaker 16 or audio from a speaking party becomes unnecessary.

Processing for Detection of Speaking Party Direction

Figure 7A:
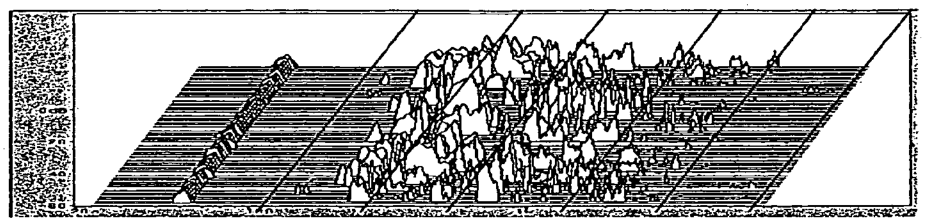
FIGS. 7A to 7D are graphs showing the results of analysis of the directivities of microphones having the characteristics illustrated in FIG. 6.
Figure 7B:
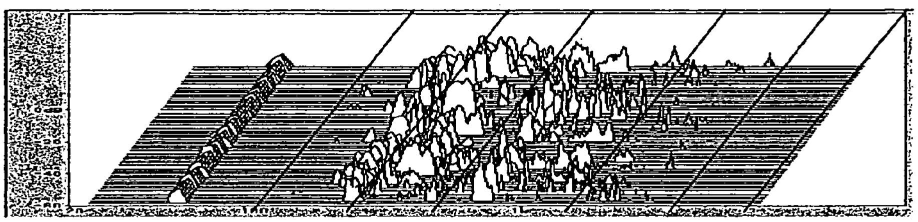
Figure 7C:
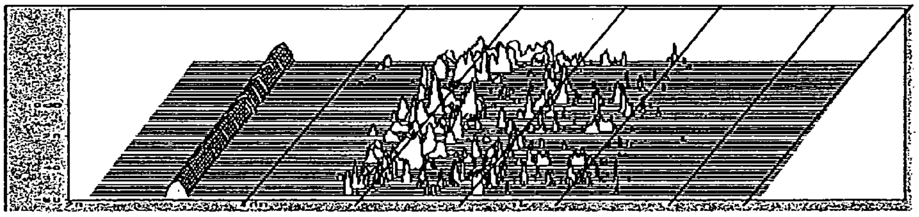
Figure 7D:
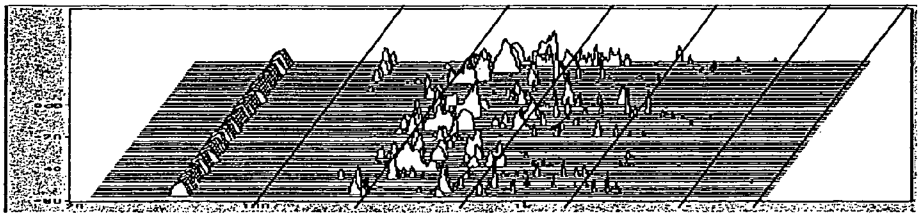

For the detection of the speaking party direction, the characteristics of the single directivity microphones exemplified in FIG. 6 are utilized. In the single directivity characteristic microphones, as-exemplified in FIG. 6, the frequency characteristic and level characteristic change according to the angle of the audio from the speaking party reaching the microphones. The results are exemplified in FIGS. 7A to 7C. FIGS. 7A to 7C show the results of application of the FFT to audio picked up by microphones at constant time intervals by placing the speaker at a distance of 1.5 meters from the two-way communication apparatus 1. The X-axis represents the frequency, the Y-axis represents the signal level, and the Z-axis represents time. The lateral lines represent the cut-off frequency of the bandpass filter. The level of the frequency band sandwiched by these lines becomes the data from the microphone signal level conversion processing passing through five bands of bandpass filters and converted to the sound pressure level explained by referring to FIG. 14 to FIG. 17.

The method of judgment applied as the actual processing for detecting the speaking party direction in the two-way communication apparatus 1 as an embodiment of the present invention will be described next.

Suitable weighting processing (0 when 0 dBF in a 1 dB full span (1 dBFs) step, while 3 when −3 dBFs, or vice versa) is carried out with respect to the output level of each band of bandpass filter. The resolution of the processing is determined by this weighting step.

The above weighting processing is executed for each sample clock, the weighted scores of each microphone are added, the result is averaged for the constant number of samples, and the microphone signal having a small (large) total points is judged as the microphone facing the speaking party. The following Table 2 indicates the results of this as an image.

TABLE 2

| | BPF1 | BPF2 | BPF3 | BPF4 | BPF5 | Sum |
|---|---|---|---|---|---|---|
| MIC1 | 20 | 20 | 20 | 20 | 20 | 100 |
| MIC2 | 25 | 25 | 25 | 25 | 25 | 125 |
| MIC3 | 30 | 30 | 30 | 30 | 30 | 150 |
| MIC4 | 40 | 40 | 40 | 40 | 40 | 200 |
| MIC5 | 30 | 30 | 30 | 30 | 30 | 150 |
| MIC6 | 25 | 25 | 25 | 25 | 25 | 125 |

Case Where Signal Levels Are Represented by Points

In this example, MIC 1 has the smallest total points, so the DSP 25 judges that there is a sound source in the direction of the microphone 1. The DSP 25 holds the result in the form of a sound source direction microphone number.

As explained above, the DSP 25 weights the output level of the bandpass filter of the frequency band for each microphone, ranks the outputs of the bands of bandpass filters in the sequence from the microphone signal having the smallest (or largest) point up, and judges the microphone signal having the first order for three bands or more as from the microphone facing the speaking party. Then, the DSP 25 prepares the score card as in the following Table 3 indicating that there is a sound source in the direction of the microphone 1.

TABLE 3

| | BPF1 | BPF2 | BPF3 | BPF4 | BPF5 | Sum |
|---|---|---|---|---|---|---|
| MIC1 | 1 | 1 | 1 | 1 | 1 | 5 |
| MIC2 | 2 | 2 | 2 | 2 | 2 | 10 |
| MIC3 | 3 | 3 | 3 | 3 | 3 | 15 |
| MIC4 | 4 | 4 | 4 | 4 | 4 | 20 |
| MIC5 | 3 | 3 | 3 | 3 | 3 | 15 |
| MIC6 | 2 | 2 | 2 | 2 | 2 | 10 |

Case Where Signals Passed Through Bandpass Filters Are Ranked In Level Sequence

In actuality, due to the influence of the reflection of sound and standing wave according to the characteristics of the room, the score of the first microphone MC1 does not always become the top among the outputs of all bandpass filters, but if the first rank in the majority of five bands, it can be judged that there is a sound source in the direction of the microphone 1. The DSP 25 holds the result in the form of the sound source direction microphone number.

The DSP 25 totals up the output level data of the bands of the bandpass filters of the microphones in the form shown in the following Table 7, judges the microphone signal having a large level as from the microphone facing the speaking party, and holds the result in the form of the sound source direction microphone number.

$$MIC1\ \text{Level}=L1-1+L1-2+L1-3+L1-4+L1-5$$

$$MIC2\ \text{Level}=L2-1+L2-2+L2-3+L2-4+L2-5$$

$$MIC3\ \text{Level}=L3-1+L3-2+L3-3+L3-4+L3-5$$

$$MIC4\ \text{Level}=L4-1+L4-2+L4-3+L4-4+L4-5$$

$$MIC5\ \text{Level}=L5-1+L5-2+L5-3+L5-4+L5-5$$

$$MIC6\ \text{Level}=L6-1+L6-2+L6-3+L6-4+L6-5$$

Processing for Judgment of Timing of Switching of Speaking Party Direction Microphone When activated by the speech start judgment result of step 2 of FIG. 20 and detecting the microphone of a new speaking party from the detection processing result of the speaking party direction of step 3 and the past selection information, the DSP 25 issues a switch command of the microphone signal to the processing for switching selection of the microphone signal of step 5, notifies the microphone selection result displaying means 30 (light emission diodes LED1 to LED6) that the speaking party microphone was switched, and thereby informs the speaking party that the present two-way communication apparatus 1 has responded to his speech.

In order to eliminate the influence of reflection sound and the standing wave in a room having a large echo, the DSP 25 prohibits the issuance of a new microphone selection command unless the constant time (for example 0.5 second) passes after switching the microphone.

It prepares two microphone selection switch timings from the microphone signal level conversion processing result of step 1 and the detection processing result of the speaking party direction of step 3.

First method: Time when speech start can be clearly judged Case where speech from the direction of the selected microphone is ended and there is new speech from another direction.

In this case, the DSP 25 decides that speech is started after the time interval (0.5 second) or more passes after all microphone signal levels (1) and microphone signal levels (2) become the speech end threshold value level or less and when any one microphone signal level (1) becomes the speech start threshold value level or more, determines the microphone facing the speaking party direction as the legitimate sound pickup microphone based on the information of the sound source direction microphone number, and starts the microphone signal selection switch processing of step 5.

Second method: Case where there is new speech of larger voice from another direction during period where speech is continued In this case, the DSP 25 starts the judgment processing after the time interval (0.5 second) or more passes from the speech start (time when the microphone signal level (1) becomes the threshold value level or more).

When it judges that the sound source direction microphone number from the processing of 3 changed before the detection of the speech end and it is stable, the DSP 25 decides there is a speaking party speaking with a larger voice than the speaking party which is selected at present at the microphone corresponding to the sound source direction microphone number, determines the sound source direction microphone as the legitimate sound pickup microphone, and activates the microphone signal selection switch processing of step 5.

Processing for switching selection of signal of microphone facing detected speaking party The DSP 25 is activated by the command selectively judged by the command from the switch timing judgment processing of the speaking party direction microphone of step 4.

Figure 21:
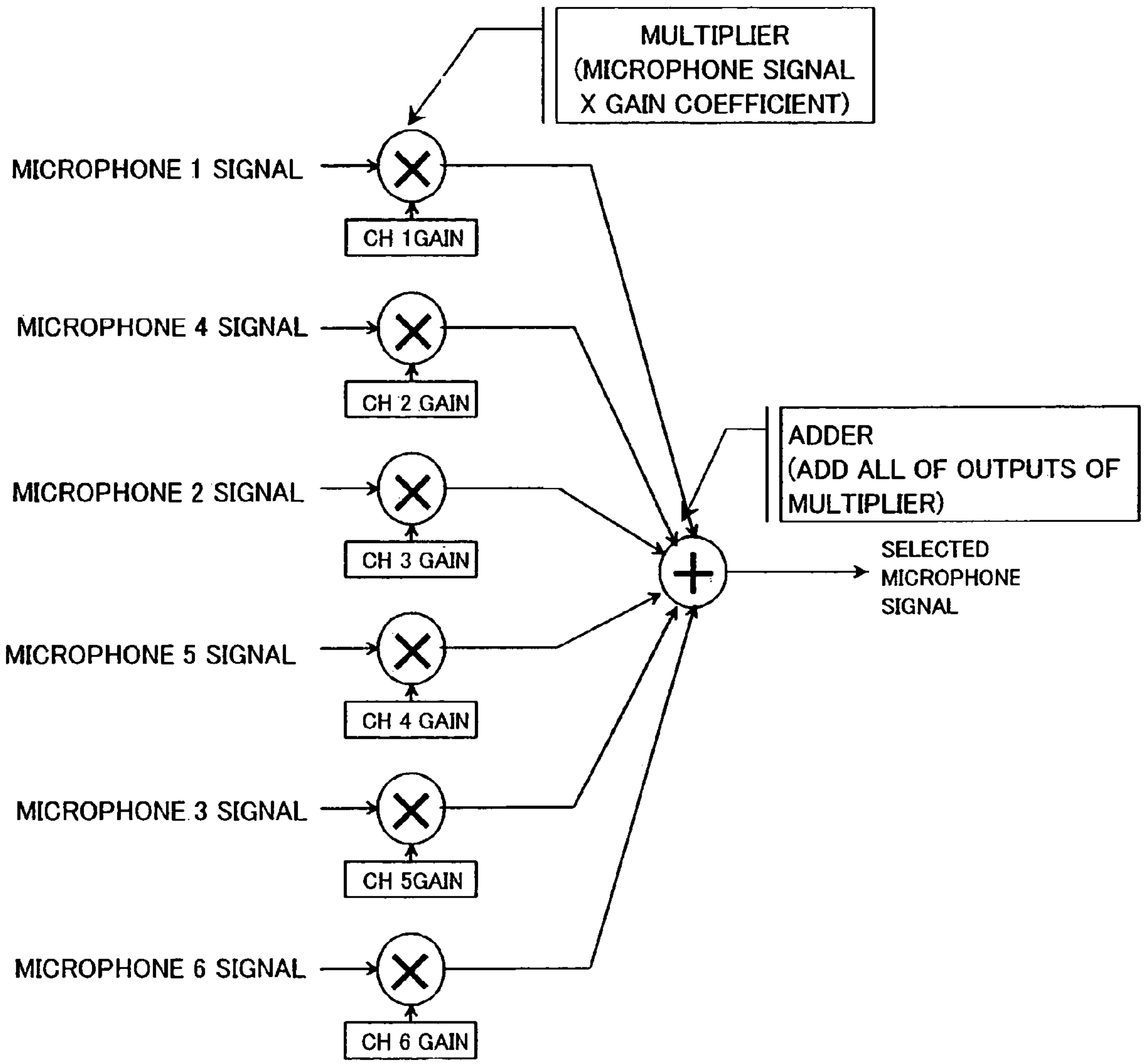
FIG. 21 is a block diagram illustrating microphone switching processing in the two-way communication apparatus of the present invention.

The processing for switching the selection of the microphone signal is realized by six multipliers and a six input adder as illustrated in FIG. 21. In order to select the microphone signal, the DSP 25 makes the channel gain (CH gain) of the multiplier to which the microphone signal to be selected is connected [1] and makes the CH gain of the other multipliers [0], whereby the adder adds the selected signal of (microphone signal×[1]) and the processing result of (microphone signal×[0]) and gives the desired microphone selection signal at the output.

Figure 22:
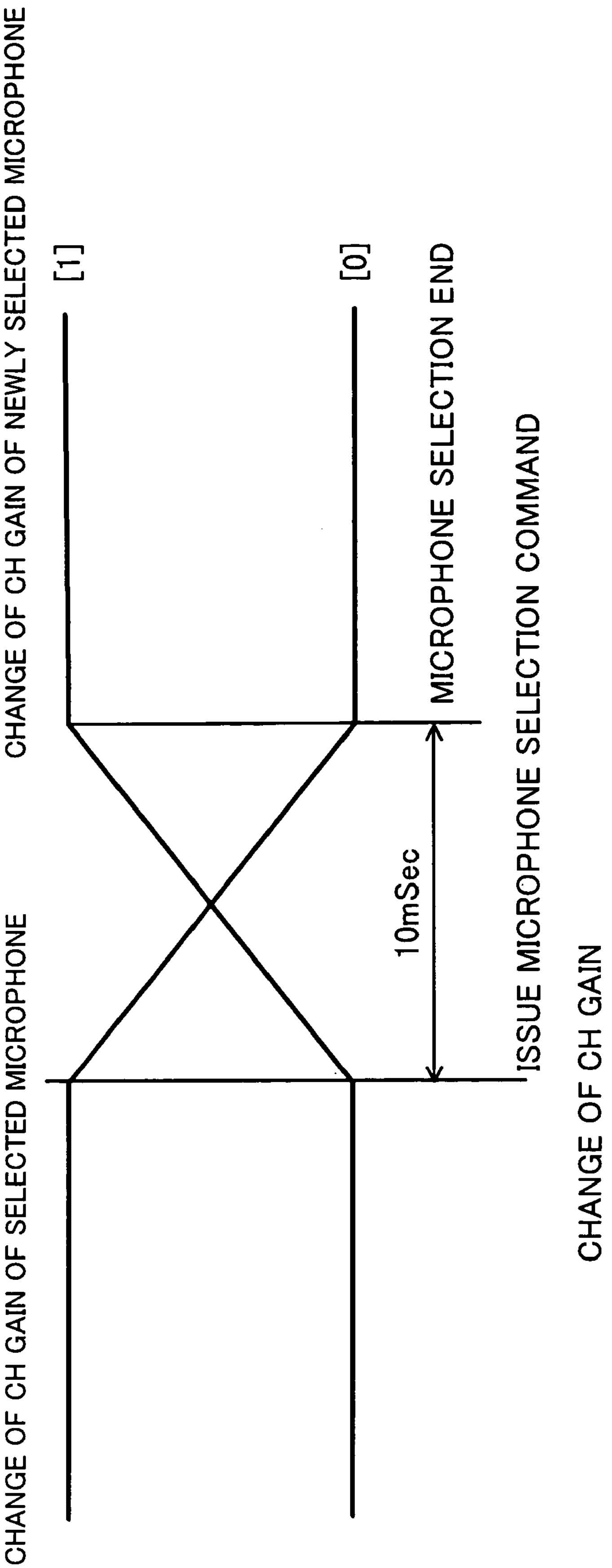
FIG. 22 is a block diagram illustrating a method of the microphone switching processing in the two-way communication apparatus of the present invention.

When the channel gain is abruptly switched from [1] to [0] as described above, there is a possibility that a clicking sound will be generated due to the level difference of the microphone signals switched. Therefore, in the two-way communication apparatus 1, as illustrated in FIG. 22, the change of the CH gain from [1] to [0] and [0] to [1] is made continuous for the time of 10 msec to cross and thereby avoid the clicking sound due to the level difference of the microphone signals.

Further, by setting the maximum CH gain to other than [1], for example [0.5], the level of output to the echo cancellation processing in the later stage can also be adjusted.

As explained above, the two-way communication apparatus of the first embodiment of the present invention can be effectively applied to a two-way communication apparatus such as a conference without the influence of noise.

Naturally, the two-way communication apparatus of the present invention is not limited to conference use and can be applied to various other purposes as well. Namely, the two-way communication apparatus of the present invention is also suited to measurement of the voltage level of the pass band when it is not necessary to stress the group delay characteristic of the pass bands. Accordingly, for example, it can also be applied to a simple spectrum analyzer, an (FFT like) level meter for applying fast fourier transform (FFT) processing, a level detection processor for confirming the equalizer processing result of a graphic equalizer etc., level meters for car stereos, radio cassette recorders, etc.

The integral microphone and speaker configuration type two-way communication apparatus (two-way communication apparatus) of the present invention has the following advantages from the viewpoint of structure:

(1) The positional relationships between the plurality of microphones MC1 to MC 6 and the receiving and reproduction speaker 16 are constant and further the distances between them are very close, therefore the level of the sound output from the receiving and reproduction speaker directly returning is overwhelmingly larger and dominant than the level of the sound output from the receiving and reproduction speaker passing through the conference room (room) environment and returning to the plurality of microphones. Due to this, the characteristics of the sound reaching from the receiving and reproduction speaker to the plurality of microphones (signal levels (intensities), frequency characteristics (f characteristics), and phases) are always the same. That is, the two-way communication apparatus has the advantage that the transmission function is always the same.

(2) Therefore, there is the advantage that there is no change of the transmission function when switching the microphone, therefore it is not necessary to adjust the gain of the microphone system whenever the microphone is switched. In other words, there is the advantage that it is not necessary to re-do the adjustment when the adjustment is once carried out at the time of manufacture of the present two-way communication apparatus.

(3) Even if the microphone is switched for the same reason as the above description, the number of echo cancellers (DSP 26) may be kept to one. A DSP is expensive. Also, the space for arranging the DSP on the printed circuit board, which has little empty space since various members are mounted, may be kept small.

(4) The transmission functions between the receiving and reproduction speaker and the plurality of microphones are constant, so there is the advantage that the adjustment of the sensitivity difference of a microphone per se of ±3 dB can be carried out just by the unit.

(4) As the table on which the two-way communication apparatus is mounted, usually use is made of a round table, so a speaker system for equally dispersing (scattering) audio having a uniform quality in all directions by one receiving and reproduction speaker in the two-way communication apparatus became possible.

(5) The sound output from the receiving and reproduction speaker is propagated through the table surface (boundary effect) and good quality sound effectively, efficiently, and equally reaches the conference participants, the sound at the opposing side is cancelled in phase in the ceiling direction of the conference room to become a small sound, there is a little reflection sound from the ceiling direction to the conference participants, and as a result a clear sound is distributed to the participants.

(6) The sound output from the receiving and reproduction speaker simultaneously arrives at all of the microphones with the same volume, therefore it becomes easy to decide if the sound is audio of a speaking party or received audio. As a result, erroneous decision in the microphone selection processing is reduced.

(7) By arranging an even number of microphones at equal intervals, the level comparison for detecting the direction can be easily carried out.

(8) By the dampers, the microphone support members, etc., the influence upon the sound pickup of the microphones due to the vibration of the sound of the receiving and reproduction speaker can be reduced.

(9) The sound of the receiving and reproduction speaker does not directly enter the microphones. Accordingly, in this two-way communication apparatus, there is a little influence of the noise from the receiving and reproduction speaker.

The integral microphone and speaker configuration type two-way communication apparatus of the present invention has the following advantages from the viewpoint of the signal processing:

(a) A plurality of single directivity microphones are arranged at equal intervals radially to enable the detection of the sound source direction, and the microphone signal is switched to pick up (collect) sound having a good S/N and clear sound to enable the transmission of it to the other parties.

(b) It is possible to pick up sounds from surrounding speaking parties with a good S/N condition and automatically select the microphone facing the speaking party.

(c) In the present invention, as the method of the microphone selection processing, the pass audio frequency band is divided and the levels at the times of the divided frequency bands are compared to thereby simplify the signal analysis.

(d) The microphone signal switch processing of the present invention is realized as signal processing of the DSP. All of the plurality of signals are cross faded to prevent a clicking sound from being issued when switching.

(e) The microphone selection result can be notified to microphone selection result displaying means such as light emission diodes or the outside. Accordingly, it is also possible to make good use of this as speaking party position information for a TV camera.

LIST OF REFERENCES

1 . . . integral microphone and speaker configuration type two-way communication apparatus
- 11 . . . upper cover
- 12 . . . sound reflection plate
- 13 . . . coupling members
- 14 . . . speaker housing
- 15 . . . operation unit
- 16 . . . receiving and reproduction speaker
- 17 . . . fastening member
- 18 . . . damper

2 . . . microphone electronic circuit housing
- 21 . . . printed circuit board
- MC1 to MC . . . microphone
- 22*a*, 22*b* . . . microphone support member
- 23 . . . microprocessor
- 24 . . . codec
- 25 . . . first digital signal processor (DSP1)
- 26 . . . second digital signal processor (DSP2)
- 27 . . . A/D converter block
- 28 . . . D/A converter block
- 29 . . . amplifier block 29
- 30 . . . microphone selection result displaying means
- LED1 to LED6 . . . light emitting diode

The invention claimed is:

1. An integral microphone and speaker configuration type two-way communication apparatus comprising:

a speaker directed to a substantially vertical direction;

a speaker housing having the speaker built in and an upper sound output opening for emitting the sound of the speaker at a center perpendicular portion and having side surfaces inclined or curved outward;

a sound reflection plate centered in a substanially vertical direction facing the speaker, having surfaces facing the side surfaces of the speaker housing curved to a conical flared shape, and diffusing sound output from the upper sound output opening in all orientations orientations in the horizontal direction by cooperating with the side surfaces of the speaker housing;

at least one pair of microphones having directivity located in an opening end of the sound reflection plate and arranged around the center axis of the speaker radially in the horizontal direction and on straight lines straddling the center axis;

a first signal processing means for processing received sound signals of the microphones;

wherein the first signal processing means weights output levels of a plurality of bandpass filters, wherein pass bands are consecutive portions of the frequency band for each microphone, wherein the first signal processing means ranks the weighted output levels of the bands of bandpass filters, and wherein the first signal processing means determines the microphone having an output level in the first rank as the microphone facing a speaking party; and a second signal processing means for processing the processong results of the first signal processing means so as to cancel echo of the audio signal components output from the speaker, the at least one pair of microphones being located at equal distances from said speaker.

2. An integral microphone and speaker configuration type two-way communication apparatus as set forth in claim 1, wherein the first signal processing means receives as input the received sound signals of the one pair of microphones, wherein the first signal processing means selects the microphone from which the highest sound is detected, and sends the received signals thereof.

3. An integral microphone and speaker configuration type two-way communication apparatus as set forth in claim 2, wherein the first signal processing means eliminates from the picked up sound signals of the microphones a noise component identified by measuring noise of the environment in which the two-way communication apparatus is previously disposed when selecting the microphone.

4. An integral microphone and speaker configuration type two-way communication apparatus as set forth in claim 2, wherein the first signal processing means refers to the signal difference of the pair of microphones to detect the direction of the highest audio and determine the microphone to be selected.

5. An integral microphone and speaker configuration type two-way communication apparatus as set forth in claim 2, wherein the first signal processing means separates bands of the received sound signals of the microphones when selecting the microphone and converts the in level to determine the microphone to be selected.

6. An integral microphone and speaker configuration type two-way communication apparatus as set forth in claim 2, wherein the two-way communication apparatus has an outputting means for enabling visual discrimination of the selected microphone, and the first signal processing means outputs the received sound signals to the corresponding outputting means when selecting the microphone.

7. An integral microphone and speaker configuration type two-way communication apparatus as set forth in claim 6, wherein the outputting means is a light emission diode.

* * * * *